(12) United States Patent
Imai et al.

(10) Patent No.: US 11,707,681 B2
(45) Date of Patent: Jul. 25, 2023

(54) INFORMATION PROCESSING SYSTEM FOR A MULTIPLE MODE TEAM GAME, NON-TRANSITORY COMPUTER-READABLE STORAGE MEDIUM HAVING STORED THEREIN INFORMATION PROCESSING PROGRAM, INFORMATION PROCESSING APPARATUS, AND INFORMATION PROCESSING METHOD FOR THE SAME

(71) Applicant: Nintendo Co., Ltd., Kyoto (JP)

(72) Inventors: Daiji Imai, Kyoto (JP); Hiroaki Tamura, Kyoto (JP); Takahiro Iwasaki, Kyoto (JP); Kenichiro Yoshioka, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 19 days.

(21) Appl. No.: 17/466,175

(22) Filed: Sep. 3, 2021

(65) Prior Publication Data

US 2022/0126209 A1   Apr. 28, 2022

(30) Foreign Application Priority Data

Oct. 28, 2020   (JP) .............................. 2020-180307

(51) Int. Cl.
| | | |
|---|---|---|
| *A63F 13/69* | (2014.01) | |
| *A63F 13/847* | (2014.01) | |
| *A63F 13/46* | (2014.01) | |
| *A63F 13/803* | (2014.01) | |
| *A63F 13/798* | (2014.01) | |

(52) U.S. Cl.
CPC .............. *A63F 13/69* (2014.09); *A63F 13/46* (2014.09); *A63F 13/798* (2014.09); *A63F 13/803* (2014.09); *A63F 13/847* (2014.09); *A63F 2300/638* (2013.01)

(58) Field of Classification Search
None
See application file for complete search history.

(56) References Cited

U.S. PATENT DOCUMENTS

2019/0308100 A1* 10/2019 Matsushita ........... A63F 13/795
2020/0306646 A1* 10/2020 Chaput .................. A63F 13/48

OTHER PUBLICATIONS

"Fire Emblem Heroes", [online], 2017, Nintendo Co., Ltd., [searched on Oct. 1, 2020], internet (https://support.fire-emblem-heroes.com/voting_gauntlet/howtoplay), printed Sep. 3, 2021.

* cited by examiner

*Primary Examiner* — Damon J Pierce
(74) *Attorney, Agent, or Firm* — Scully, Scott, Murphy & Presser, P.C.

(57) ABSTRACT

During a predetermined period, a team competition event is held. If a game regarding the team competition event is performed using a character belonging to a user team to which a user belongs, the user can acquire team medals, and the team medals are added to the user team. If, on the other hand, the game is performed using a character belonging to a team other than the user team to which the user belongs, the team medals are not added to the user team. After the lapse of the predetermined period, in accordance with team medals of each team, the result of the team competition event is displayed.

18 Claims, 11 Drawing Sheets

FIG. 2

| USER | OWNED CHARACTER |
|---|---|
| USER Y1 | CHARACTER A2, CHARACTER A3, CHARACTER B2, CHARACTER B4 |
| USER Y2 | CHARACTER A1, CHARACTER B1, CHARACTER B2 |
| USER Y3 | CHARACTER A1, CHARACTER A2, CHARACTER B2 |

| TEAM | LEADER CHARACTER | MEMBER CHARACTER |
|---|---|---|
| TEAM A | CHARACTER A | CHARACTER A1, CHARACTER A2, CHARACTER A3, CHARACTER A4 |
| TEAM B | CHARACTER B | CHARACTER B1, CHARACTER B2, CHARACTER B3, CHARACTER B4 |

RACE GAME USING CHARACTER BELONGING TO USER TEAM

RACE GAME USING CHARACTER BELONGING TO TEAM OTHER THAN USER TEAM

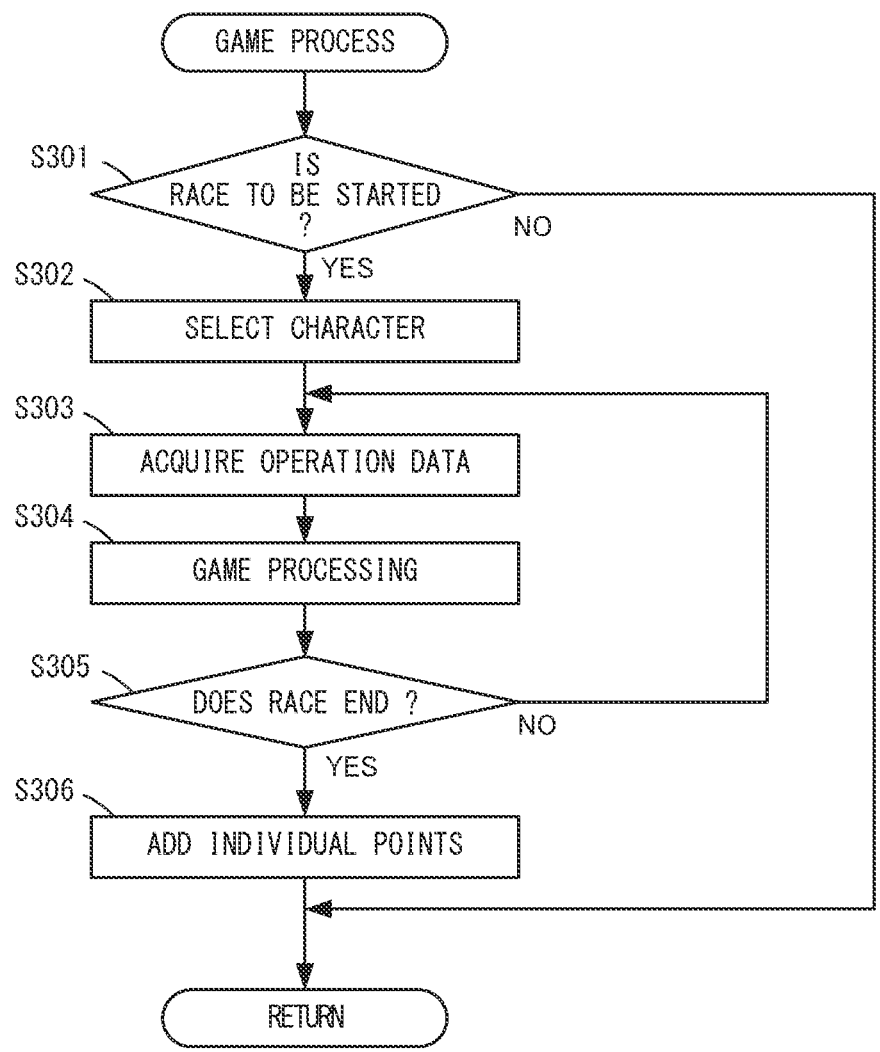
F I G. 1 4

INFORMATION PROCESSING SYSTEM FOR A MULTIPLE MODE TEAM GAME, NON-TRANSITORY COMPUTER-READABLE STORAGE MEDIUM HAVING STORED THEREIN INFORMATION PROCESSING PROGRAM, INFORMATION PROCESSING APPARATUS, AND INFORMATION PROCESSING METHOD FOR THE SAME

CROSS REFERENCE TO RELATED APPLICATION

This application claims priority to Japanese Patent Application No. 2020-180307 filed on Oct. 28, 2020, the entire contents of which are incorporated herein by reference.

FIELD

An exemplary embodiment relates to an information processing system for executing a game, a non-transitory computer-readable storage medium having stored therein an information processing program, an information processing apparatus, and an information processing method.

BACKGROUND AND SUMMARY

As a related art, there is a game where a plurality of users on a plurality of teams perform a team competition battle during a predetermined period.

There is room for improvement in providing a variety of play styles to a user in a game where a team competition event is held by a plurality of teams.

Therefore, it is an object of an exemplary embodiment to provide an information processing system for providing a variety of play styles to a user regarding a team competition event performed by a plurality of teams.

To achieve the above object, the exemplary embodiment employs the following configurations.

An information processing system according to the exemplary embodiment is an information processing system for providing a team competition event performed by a plurality of teams to a user during a predetermined period. The information processing system includes: at least one processor and a memory coupled thereto, the at least one processor being configured to control the information processing system to at least: set as a user team a team to which the user belongs among the plurality of teams; execute a game regarding the team competition event using a user content owned by the user among a plurality of contents during the predetermined period; in a case where the game is executed, and if the user content used in the game and the user team are associated with each other, enable a first parameter regarding the user team to be updated, and if the user content used in the game and a team other than the user team are associated with each other, restrict the update of the first parameter; in a case where the game is executed, regardless of whether or not the user content used in the game and the user team are associated with each other, set a second parameter regarding the user in accordance with a result of the game, and based on the second parameter, give a first reward to the user; and after a lapse of the predetermined period, based on the updated first parameter of each of the plurality of teams, present winning or losing or rankings between the plurality of teams in the team competition event to the user.

Based on the above, for example, if a user content used to execute a game belongs to a user team, it is possible to update a first parameter regarding the user team, thereby influencing the winning or losing or the rankings between teams in a team competition event. If the user content belongs to a team other than the user team, it is possible to restrict the update of the first parameter and also set a second parameter and give a first reward to a user. Consequently, it is possible to provide various play styles regarding the game to the user.

In another configuration, the game may include a plurality of game stages different in advantageousness in the game according to which of the plurality of contents is used. The at least one processor may be configured to control the information processing system to select any of the plurality of user contents based on an operation of the user. The game may be executed at any of the plurality of game stages using the selected user content.

Based on the above, there are a plurality of contents different in advantageousness with respect to each game stage. The user can select any of the plurality of user contents and execute a game stage using the selected user content. Consequently, for example, the user can select a user content advantageous for the game stage to be executed and perform the game. Even in a case where the user content used in the game is associated with the team other than the user team, it is possible to cause the user to perform the game.

In another configuration, if the user content used in the game and the user team are associated with each other, the game may be executed in a first mode. If the user content used in the game and the user team are not associated with each other, the game may be executed in a second mode different from the first mode.

Based on the above, it is possible to execute the game in different modes between a case where the user content used in the game and the user team are associated with each other and a case where the user content used in the game and the team other than the user team are associated with each other.

In another configuration, the game may be a game where a movement object can be moved in a virtual space. In the first mode, an update object capable of updating the first parameter may be placed in the virtual space. In the second mode, the update object may not be placed in the virtual space. In the first mode, if the movement object acquires the update object, the first parameter may be updated.

Based on the above, an update object is placed in a virtual space in a first mode, whereby a movement object can acquire the update object. If the movement object acquires the update object, the first parameter can be updated.

In another configuration, the at least one processor may be configured to control the information processing system to set a team selected by the user as the user team. The at least one processor may be configured to control the information processing system to give a content relating to the user team to the user when the user selects the user team.

Based on the above, when the user selects a team, it is possible to give a content relating to the selected team to the user. Consequently, after the user selects the team, it is possible to perform the game using the given content.

In another configuration, the at least one processor may be configured to control the information processing system to give a second reward to the user using the first parameter updated in the game.

Based on the above, it is possible to give a second reward to the user using the first parameter. Consequently, it is possible to cause the user to execute the game and update the first parameter.

In another configuration, the game may be a competition game performed by the plurality of teams. Each of the plurality of contents may belong to any of the plurality of teams. The at least one processor may be configured to control the information processing system to, based on an operation of the user, select the user content belonging to the user team or the user content belonging to the team other than the user team. The at least one processor may be configured to control the information processing system to execute the competition game using the selected user content. If the competition game is performed using the user content belonging to the user team, the at least one processor may be configured to control the information processing system to update the first parameter. If the competition game is performed using the user content belonging to the team other than the user team, the at least one processor may restrict the update of the first parameter.

Based on the above, the user can select a user content belonging to the user team or a user content belonging to the team other than the user team and perform a competition game using the selected user content.

In another configuration, regardless of whether the competition game is performed using the user content belonging to the user team or the competition game is performed using the user content belonging to the team other than the user team, the first reward may be given in accordance with a result of the competition game.

Based on the above, no matter which of the teams the user content belongs to, it is possible to give the first reward to the user in accordance with the result of the competition game.

In another configuration, the user content may include a first user content and a second user content with which the competition game is performed more favorably to the user than with the first user content. Regardless of whether or not the second user content belongs to the user team, if the competition game is performed using the second user content, the first reward may be more likely to be given to the user than in a case where the competition game is performed using the first user content.

Based on the above, in a case where a second user content is used, it is possible to advance the competition game advantageously. Regardless of whether or not the second user content belongs to the user team, it is possible to give the first reward to the user. Consequently, for example, even in a case where the second user content belongs to the team other than the user team, it is possible to cause the user to perform the competition game using the second user content.

In another configuration, the at least one processor may be configured to control the information processing system to, after the lapse of the predetermined period, give a third reward to the user based on the winning or losing or the rankings between the plurality of teams in the team competition event.

Based on the above, it is possible to give a third reward in accordance with the result of the team competition event.

An information processing system according to another exemplary embodiment is an information processing system for providing a team competition event performed by a plurality of teams to a user during a predetermined period. The information processing system includes: at least one processor and a memory coupled thereto, the at least one processor being configured to control the information processing system to at least: set as a user team a team to which the user belongs among the plurality of teams; execute a game regarding the team competition event using a user content owned by the user among a plurality of contents during the predetermined period; if the user content used in the game and the user team are associated with each other, execute the game in a first game mode; if the user content used in the game and a team other than the user team are associated with each other, execute the game in a second game mode; in a case where the game is executed, regardless of whether or not the user content used in the game and the user team are associated with each other, in accordance with a result of the game in the first game mode or the second game mode, give a reward to the user; and after a lapse of the predetermined period, based on the result of the game in the first game mode, present winning or losing or rankings between the plurality of teams in the team competition event to the user.

Based on the above, if a user content used in a game and a user team are associated with each other, it is possible to execute the game in a first game mode and influence the winning or losing or the rankings between teams in a team competition event. If, on the other hand, the user content used in the game and a team other than the user team are associated with each other, it is possible to execute the game in a second game mode. It is possible to influence the team competition event based on the execution result of the game in the first game mode. The game is executed in both the first game mode and the second game mode, whereby it is possible to give a reward to the user in accordance with the result of the game.

Another exemplary embodiment may be an information processing method performed by the information processing system. Another exemplary embodiment may be an information processing apparatus for executing processes of the information processing system, or an information processing program executed by a computer of the information processing apparatus.

According to the exemplary embodiment, if a user content used in a game and a user team are associated with each other, it is possible to influence the winning or losing or the rankings between teams in a team competition event. Thus, even in a case where the user content and a team other than the user team are associated with each other, it is possible to give a reward to a user. Thus, it is possible to provide various play styles to the user.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 2 is an example non-limiting diagram showing examples of characters owned by each user;

FIG. 14 is an example non-limiting flow chart showing an example of a normal game process in step S111.

DETAILED DESCRIPTION OF NON-LIMITING EXAMPLE EMBODIMENTS

Figure 1:
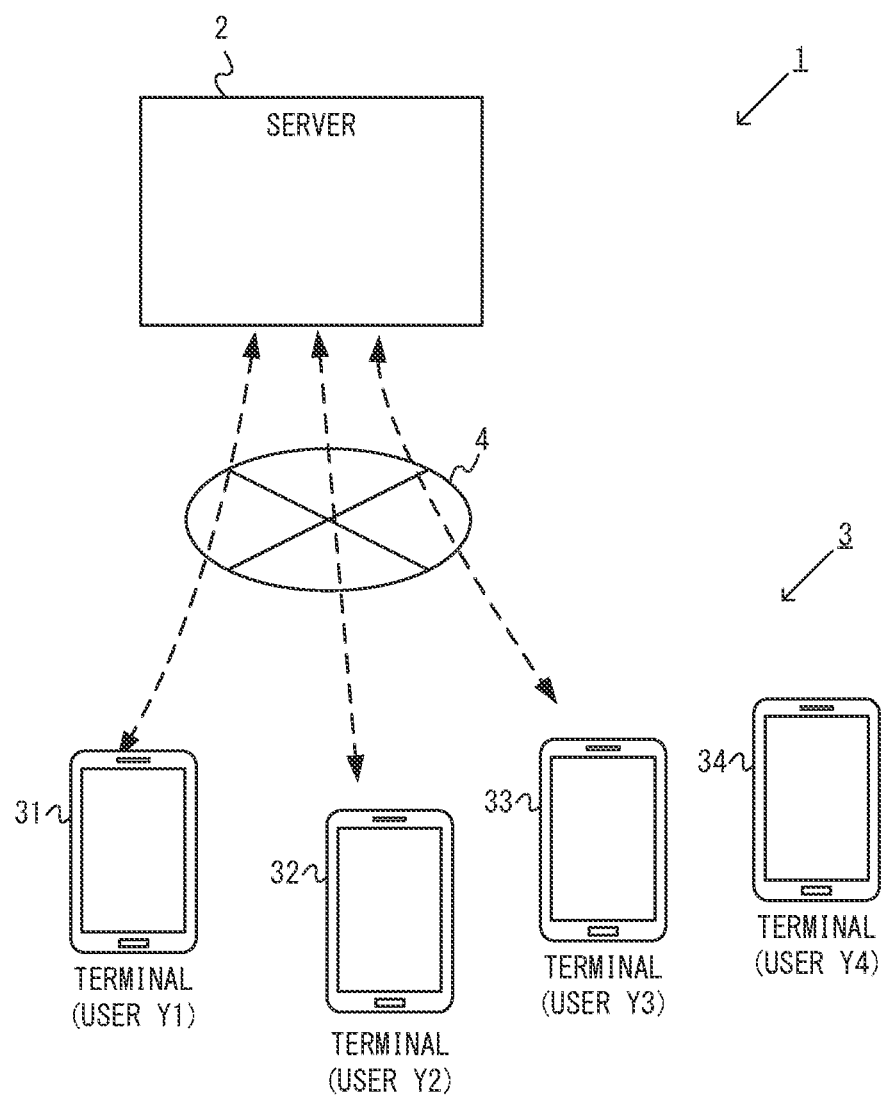
FIG. 1 is an example non-limiting diagram showing an example of the configuration of an information processing system 1 according to an exemplary embodiment.

With reference to the drawings, an information processing system (a game system) according to an exemplary embodiment is described below. FIG. 1 is a diagram showing an example of the configuration of an information processing system 1 according to the exemplary embodiment. As shown in FIG. 1, the information processing system 1 includes a server 2 and a plurality of user terminals 3 (31 to 34 in FIG. 1). The server 2 and the plurality of user terminals 3 are connected together through the Internet 4 (an example of a network).

The server 2 includes at least one processor (CPU), a memory, a storage device such as a magnetic disk or a non-volatile memory, and a communication apparatus for connecting to the Internet. The server 2 executes a predetermined information processing program for holding a team competition event according to the exemplary embodiment. The server 2 controls a game (a racing game described below) performed in each user terminal 3. The server 2 may be formed of a plurality of server apparatuses, or may be formed of a single server apparatus. The server 2 may be formed by placing a server apparatus and a storage device at physically remote locations and connecting the server apparatus and the storage device through a network (e.g., the Internet).

The user terminal 3 is, for example, a smartphone. The user terminal 3 may be any information processing apparatus such as a mobile phone, a tablet terminal, a personal computer, or a mobile or stationary game apparatus. The plurality of user terminals 3 may be terminals of different types, or may be terminals of the same type. For example, some of the plurality of user terminals 3 may be smartphones, and some of the plurality of user terminals 3 may be tablet terminals. Each of the plurality of user terminals 3 may include an OS (Operating System) of a different type.

As shown in FIG. 1, for example, the user terminal 31 is used by a user Y1. The user terminal 32 is used by a user Y2. The user terminal 33 is used by a user Y3. The user terminal 34 is used by a user Y4. As well as the user terminals 31 to 34, user terminals 3 relating to many users are also connected to the server 2 through the Internet 4.

Each user terminal 3 includes a CPU (not shown), a memory, a display device, input devices (e.g., a touch panel and a button), a storage device such as a magnetic disk or a non-volatile memory, and a communication apparatus for connecting to the Internet. The user terminal 3 may include, as input devices, inertial sensors (an angular velocity sensor and an acceleration sensor) for detecting the orientation of the user terminal 3. A predetermined game application is installed on the user terminal 3. Each user executes the game application on the user terminal 3 of the user, thereby performing a predetermined game.

Here, in the exemplary embodiment, as an example of the predetermined game, a racing game using a plurality of characters prepared in advance is performed. The racing game is a competition game performed using a plurality of characters selected from among a plurality of characters (e.g., ten characters A, A1 to A4, B, and B1 to B4). Each user owns one or more characters. Each user performs a racing game where a race car is driven along a course using a character owned by the user as a driver.

FIG. 2 is a diagram showing examples of the characters owned by each user. As shown in FIG. 2, for example, the user Y1 owns the characters A2, A3, B2, and B4. For example, the user Y2 owns the characters A1, B1, and B2. For example, the user Y3 owns the characters A1, A2, and B2. The storage device of the server 2 stores information regarding the characters owned by each user.

The racing game performed in each user terminal 3 may be a single-play game performed by a character operated by the user of the user terminal 3 and a plurality of CPU characters controlled by the CPU of the user terminal 3. For example, when the user Y1 starts the predetermined game using the user terminal 31 of the user Y1, the user Y1 selects the character A2 owned by the user Y1. The CPU of the user terminal 31 automatically selects a plurality of characters other than the character A2. The racing game is performed using the character A2 selected by the user Y1 and the plurality of CPU characters selected by the CPU. During the racing game, the character A2 is controlled based on an operation of the user Y1 (an input to the input device of the user terminal 3). The plurality of CPU characters are automatically controlled by the CPU of the user terminal 31. The CPU characters may be selected by the CPU of the user terminal 31, or may be selected by the server 2. During the racing game, the CPU characters may be controlled by the CPU of the server 2.

Alternatively, the racing game performed in each user terminal 3 may be a multiplay game performed by a character operated by the user of the user terminal 3 and a character operated by a user different from the user of the user terminal 3. For example, when the user Y1 starts the predetermined game using the user terminal 31, the user Y1 selects the character A2 owned by the user Y1. Information indicating that the predetermined game is started by the user terminal 31 and information regarding the character selected by the user Y1 are transmitted to the server 2. At the same time, for example, the user Y2 starts the predetermined game using the user terminal 32 and selects the character B1 owned by the user Y2. Information indicating the start of the predetermined game and information regarding the selected character B1 are transmitted from the user terminal 32 to the server 2. Based on the information received from each user terminal 3, the server 2 matches the users to compete against each other. The racing game may be started by a plurality of users matched as described above. For example, the server 2 may match the user Y1 and the user Y2 and cause the user Y1 and the user Y2 to perform a racing game where the user Y1 and the user Y2 compete against each other. In this case, the server 2 may transmit operation information received from each user terminal 3 to the user terminal 3 of the other matched user, and each user terminal 3 may perform game processing. Alternatively, operation information regarding each user (input information regarding an input to the input device of the user terminal 3) may be transmitted to the server 2, the server 2 may perform game processing regarding the racing game performed by the plurality of users, the result of the game processing may be transmitted to each terminal, and each terminal may display a game image relating to the result of the game processing.

In the exemplary embodiment, in the information processing system 1, during a predetermined period, a predetermined game event held by a plurality of users is executed using the plurality of user terminals 3 and the server 2. The predetermined game event is an event related to the predetermined game (the racing game) performed in each user terminal 3 and is a team competition event performed by a plurality of teams. Specifically, in the exemplary embodiment, each of the plurality of users belongs to any of the plurality of teams, and the team competition event is held by the plurality of teams.

Figures 3, 4:
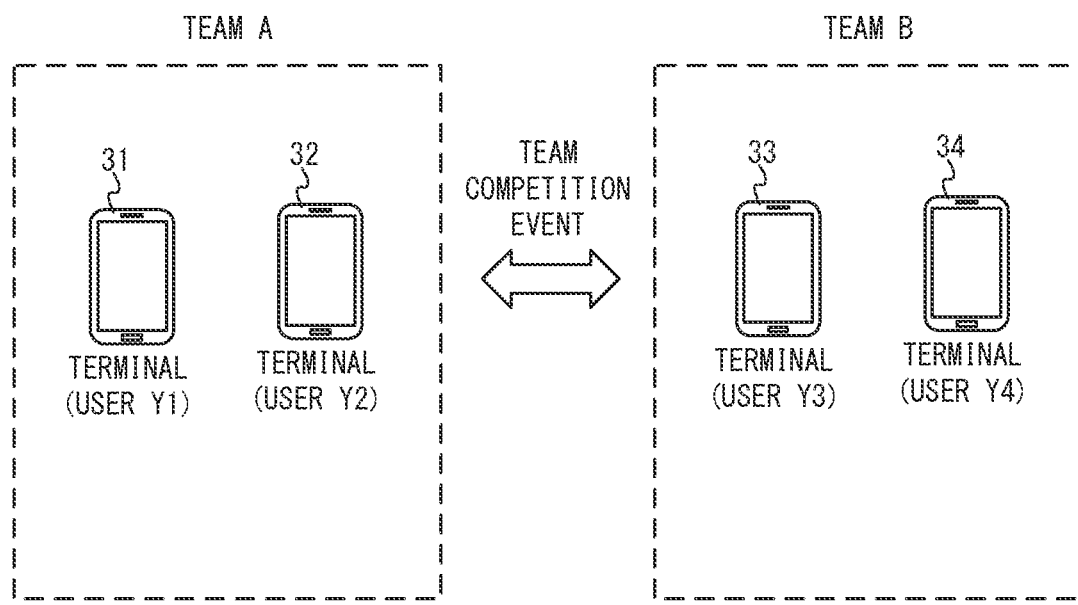
FIG. 3 is an example non-limiting diagram showing an overview of a team competition event performed in the information processing system 1 according to the exemplary embodiment.
FIG. 4 is an example non-limiting diagram showing examples of characters belonging to each team.

FIG. 3 is a diagram showing an overview of the team competition event performed in the information processing system 1 according to the exemplary embodiment.

For example, the predetermined game event is executed during a preset event period (e.g., the period from January 1 to 7, hereinafter referred to as a "specified period"). As shown in FIG. 3, each user of the information processing system 1 belongs to a team A or a team B. For example, when the predetermined game event is started, each user selects which of the team A and the team B the user is to belong to. For example, the users Y1 and Y2 select the team A and belong to the team A. The users Y3 and Y4 select the team B and belong to the team B.

The specified period may not be set to only a single time, and may be set to a plurality of times. Hereinafter, a team to which a user belongs will be referred to as a "user team". In the example shown in FIG. 3, the user team of the users Y1 and Y2 is the team A, and the user team of the users Y3 and Y4 is the team B.

Each user executes the predetermined game (the racing game) using the game terminal 3 of the user during the specified period. Based on the result of the racing game by each user, the number of team medals (an example of a first parameter) of each team is updated. The details of the update of team medals will be described below. After the lapse of the specified period, based on the number of team medals of each team, winning or losing between the teams is determined.

Here, each team is associated in advance with a plurality of characters to be used in the racing game.

FIG. 4 is a diagram showing examples of the characters belonging to each team. As shown in FIG. 4, the team A is a team of which the leader is the character A. To the team A, in addition to the leader character A, the characters A1, A2, A3, and A4 belong as member characters. The team B is a team of which the leader is the character B. To the team B, in addition to the leader character B, the characters B1, B2, B3, and B4 belong as member characters.

During the specified period, each user can perform the racing game using a character belonging to the team to which the user belongs (the user team), among the plurality of characters owned by the user. During the specified period, each user can also perform the racing game using a character belonging to a team other than the user team, among the plurality of characters owned by the user.

For example, the user Y1 owns the characters A2, A3, B2, and B4 and belongs to the team A. As shown in FIG. 4, the characters A2 and A3 belong to the team A. The user Y1 can perform the racing game using the character A2 belonging to the team A among the characters A2, A3, B2, and B4 owned by the user Y1. The user Y1 can also perform the racing game using the character B2 belonging to the team B among the characters A2, A3, B2, and B4 owned by the user Y1.

In a case where the user performs the racing game using a character of the user team among the characters owned by the user, the user can gain team medals. For example, in a case where the user Y1 performs the racing game using the character A2, the team medals are placed on the course. The user Y1 operates the character A2 (a race car) and thereby can acquire the team medals placed on the course. If the user Y1 acquires the team medals, the team medals are added to the team A.

On the other hand, in a case where the user performs the racing game using a character belonging to a team other than the user team among the characters owned by the user, the user cannot gain the team medals. For example, in a case where the user Y1 performs the racing game using the character B2, the team medals are not placed on the course. Thus, the user Y1 cannot acquire the team medals in the racing game.

Figure 5:
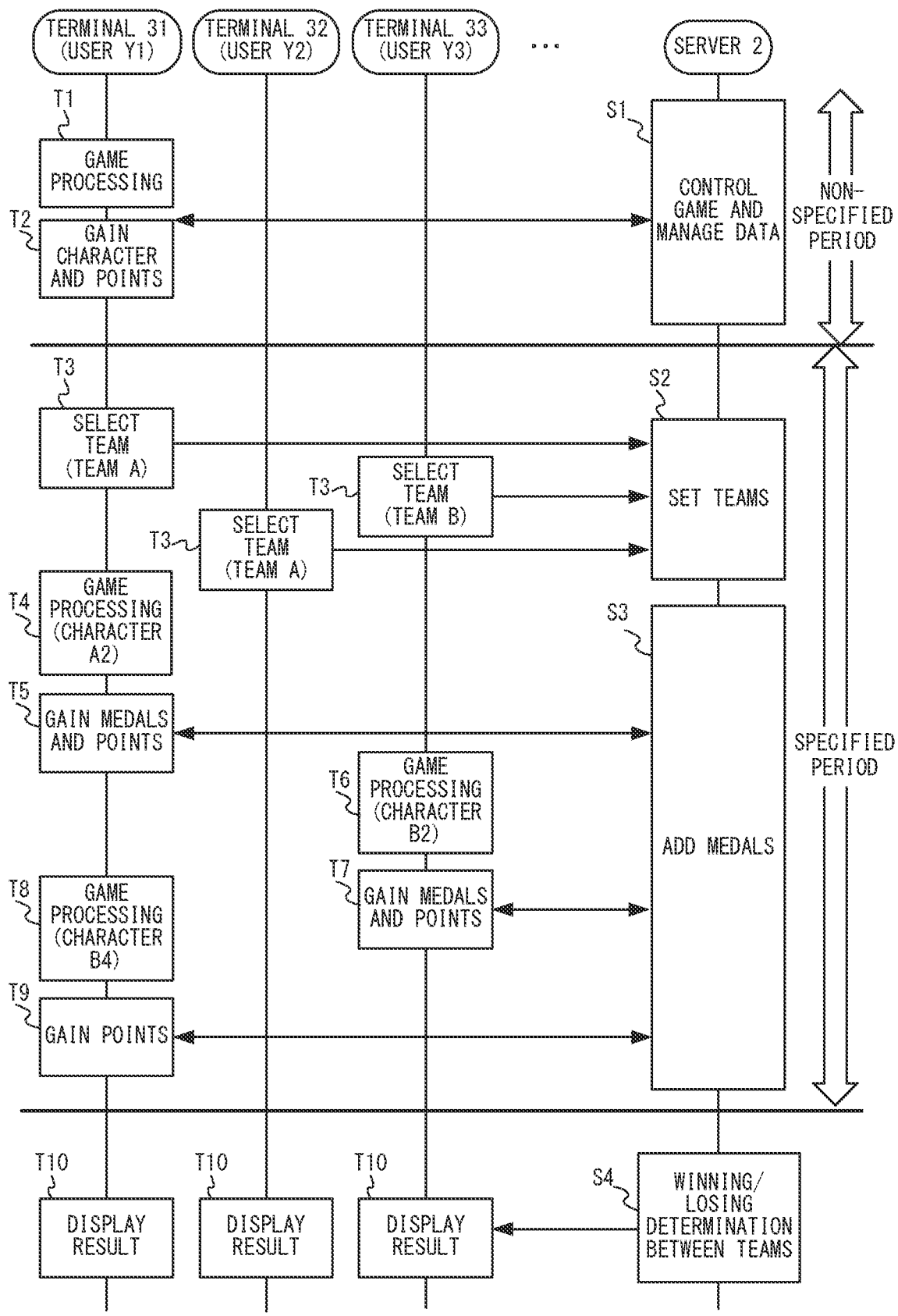
FIG. 5 is an example non-limiting diagram showing an overview of processes performed by a plurality of user terminals 3 and a server 2 in a case where a predetermined game event is held.

FIG. 5 is a diagram showing an overview of processes performed by the plurality of user terminals 3 and the server 2 in a case where the predetermined game event is held.

As shown in FIG. 5, during a non-specified period other than the specified period, for example, in accordance with the fact that the racing game is started in the user terminal 31 of the user Y1, game processing regarding the racing game is performed (T1). In the game processing in step T1, in accordance with an operation of the user Y1, a character (a race car) is controlled, and the racing game is performed. The user Y1 gains a character and individual points (T2). The character gained by a user is saved as a character owned by the user. The character can be used in the racing game. For example, in accordance with the result of the game processing, the character is given to the user Y1. The individual points are related to a reward to be given to the user and are accumulated in accordance with the result of each game process. For example, the individual points are points related to the rankings of the plurality of users. If the ranking of the user rises, the level of the user rises. If the level of the user rises, the user can perform a game at a higher level. For example, if the ranking of the user rises, the user can challenge a game at a high difficulty level, or compete against another user with a high skill. In accordance with the individual points, an item may be given as a reward. The same game processing is also performed by the user terminal 32 and the user terminal 33.

Each user terminal 3 and the server 2 communicate with each other at an appropriate timing. The server 2 performs control regarding the racing game performed in each user terminal 3 and manages data (S1). For example, the server 2 stores data regarding a character and an item owned by each user. When the game is executed in each user terminal 3, the server 2 transmits the data to the user terminal 3.

The user may be able to gain a character by various methods. For example, the user may be able to purchase a character using in-game currency obtained by performing the predetermined game, or may be able to purchase a character using real currency. Alternatively, in a case where the number of times the predetermined game is performed, the period when the predetermined game is performed, the number of times or the type of an action performed in the predetermined game, the level of the user, or the like satisfies a predetermined condition, the user may be able to gain a character.

If the specified period arrives, the team competition event is started. If the specified period is started, each user selects a team to which the user is to belong (T3). For example, the users Y1 and Y2 select the team A, and the user Y3 selects the team B. Information regarding the team selected by each user is transmitted to and stored in the server 2 (S2).

Next, for example, the user Y1 performs the racing game using the character A2 owned by the user Y1 (T4). For example, the user Y1 selects the character A2 among the plurality of characters (A2, A3, B2, and B4) owned by the user Y1. Consequently, in the user terminal 31, the racing game is started on a course where team medals are placed (a first mode). The racing game is a game where the character A2 belonging to the team A and the plurality of characters belonging to the team A or the team B compete for ranks. The racing game during the specified period is a competition game between characters (users) and is also a competition game between teams. In accordance with the rankings of the characters belonging to each team, the winning or losing between the teams in the racing game is determined.

In the racing game, the user Y1 gains team medals and individual points (T5). For example, if the character A2 operated by the user Y1 passes through team medals placed on the course, the user Y1 gains the team medals.

In addition to the team medals acquired while the character A2 is running, team medals may be further additionally given based on the result of the racing game performed by the user Y1. For example, if the team A to which the user Y1 belongs wins the racing game, team medals may be additionally given (bonus medals may be given). The number of bonus medals to be given may be set in accordance with the number of team medals acquired while the character A2 is running, or may be set in accordance with the level of the character A2, or may be a fixed value. The winning of a team may be determined based on the rankings of the characters belonging to each team. For example, the team to which a character having finished in first place in the racing game belongs may be regarded as winning in the racing game. The winning of a team may be determined based on the rankings of the characters belonging to each team and the number of characters of each team. For example, the average of the rankings of each team may be obtained, and the team having the smaller average of the rankings may be regard as winning.

In accordance with the individual points gained in the racing game by the user Y1, bonus medals may be given. A bonus period may be set for the team A or the team B. For example, if the current moment is during the bonus period set for the team A, in accordance with the number of team medals acquired by the user Y1 in the racing game, bonus medals may be given. Alternatively, in a case where various conditions are satisfied, team medals as bonus medals may be given.

Information regarding the team medals including the bonus medals and the individual points gained by the user Y1 is transmitted to the server 2. The server 2 adds as many team medals as those gained by the user Y1 to the team A to which the user Y1 belongs (S3). In step S3, in addition to the team medals acquired during the racing game by the user Y1, the above team medals (bonus medals) additionally given are also added.

On the other hand, for example, the user Y3 performs the racing game using the character B2 owned by the user Y3 (T6). The user Y3 belongs to the team B. Similarly to the above step T5, in accordance with the result of the racing game, the user Y3 gains team medals and individual points (T7). Information regarding the team medals and the individual points gained by the user Y3 is transmitted to the server 2. The server 2 adds as many team medals as those gained by the user Y3 to the team B to which the user Y3 belongs (S3).

The user Y1 further performs the racing game using a character owned by the user Y1 (T8). Specifically, the user Y1 selects the character B4 belonging to the team B different from the team A to which the user Y1 belongs, among the plurality of characters (A2, A3, B2, and B4) owned by the user Y1, and performs the racing game. Consequently, in the user terminal 31, the racing game is started on a course where team medals are not placed (a second mode). As a result of the racing game, the user Y1 gains individual points (T9). Here, in step T8, the user Y1 performs the game using the character B4 belonging to the team B other than the team A to which the user Y1 belongs. Thus, in the racing game in step T8, the user Y1 cannot gain team medals, and team medals are added to neither of the team A and the team B.

During the specified period, each user can perform the racing game multiple times. In each user terminal 3, the racing game is repeatedly performed, and as a result of the racing game, team medals are added to each team. Then, after the specified period elapses, in accordance with the accumulation value of team medals of each team, a winning/losing determination in the team competition event is made (S4). The result of the winning/losing determination is transmitted to each user terminal 3, and the result of the team competition event is displayed on each user terminal 3 (T10). With the display of the result of the team competition event, event rewards are given to all the users of the winning team.

Next, an example of a game image displayed on each user terminal 3 during the specified period is described. A description is given below of a case where the game application is executed in the user terminal 31 of the user Y1. However, the same applies to the other user terminals.

Figure 6:
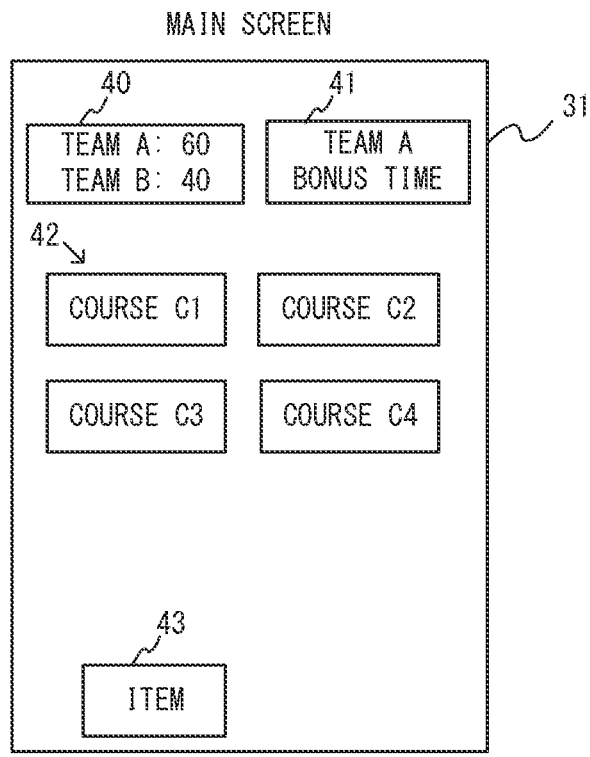
FIG. 6 is an example non-limiting diagram showing an example of a main screen displayed on a user terminal 31.

FIG. 6 is a diagram showing an example of a main screen displayed on the user terminal 31. If the game application according to the exemplary embodiment is started, the main screen shown in FIG. 6 is displayed.

As shown in FIG. 6, on the main screen, situation display 40 is displayed. The situation display 40 is displayed during the specified period and indicates the current situation of the team competition event. As the situation display 40, for example, the current percentage of team medals of the teams may be displayed, or the current accumulation values of team medals of the teams may be displayed. The situation display 40 may be displayed as numbers, or may be displayed as characters, or may be displayed as a graph. On the main screen, bonus period display 41 is also displayed. The bonus period display 41 indicates for which of the team A and the team B the bonus period is set at the current moment. In the example shown in FIG. 6, the bonus period is set for the team A at the current moment.

On the main screen, a plurality of course icons 42 relating to a plurality of courses are displayed. The course icons 42 are icons for the user to select on which of the plurality of courses the user is to perform the racing game.

On the main screen, an icon 43 for the user to exchange an item using a team medal is displayed. If the user selects the icon 43, the user can acquire an item using a team medal acquired as a result of the user performing the racing game during the specified period. An item that can be acquired here is an example of a reward to be obtained by the user by acquiring a team medal, and may be an item that is used in the racing game (influences the result of the racing game), or may be a character, or may be an image that does not influence the result of the racing game, or the like. In the exemplary embodiment, even if the user acquires an item using a team medal, the team medals added to the user team do not decrease. In another example, if an item is acquired using a team medal, the team medals of the user team may decrease.

Figure 7:
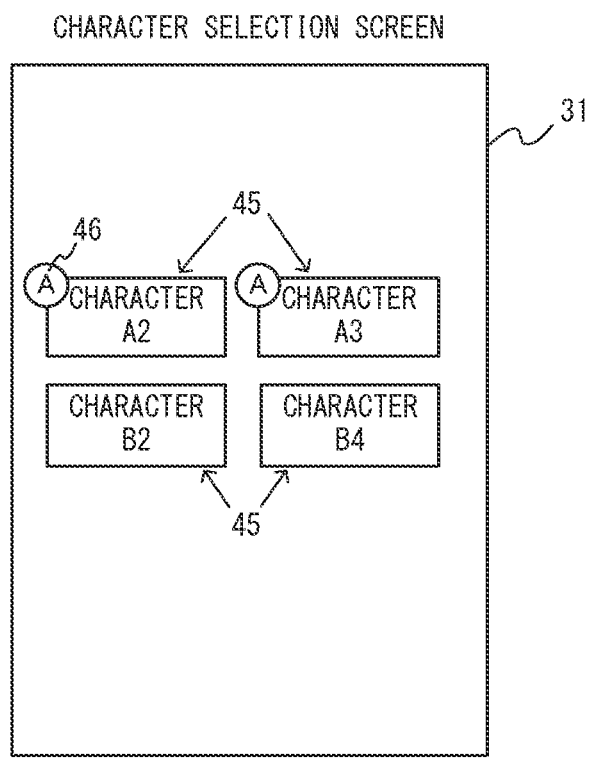
FIG. 7 is an example non-limiting diagram showing an example of a character selection screen.

In a case where any of the plurality of course icons 42 is selected on the main screen shown in FIG. 6, the main screen transitions to a character selection screen. FIG. 7 is a diagram showing an example of the character selection screen.

As shown in FIG. 7, on the character selection screen, character icons 45 indicating the plurality of characters owned by the user Y1 are displayed. To the character icons 45 of the characters belonging to the team (the user team) to which the user Y1 belongs, team images 46 indicating the team to which the user Y1 belongs are added. For example, to the character icons 45 of the characters belonging to the user team (the team A) of the user Y1, images "A" are added. On the other hand, to the character icons 45 of the characters belonging to the team B to which the user Y1 does not belong, the team images 46 are not added. With such team images 46, it is possible to cause the user to easily recognize whether or not each character owned by the user belongs to the user team.

If any one of the plurality of character icons 45 is selected on the character selection screen, the racing game is started using the character relating to the selected character icon 45.

Figure 8:
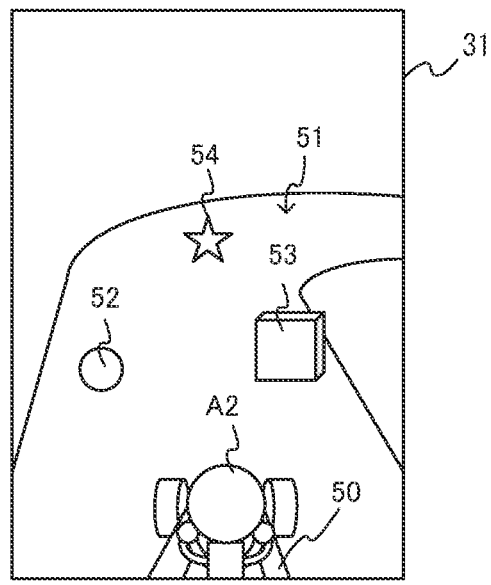
FIG. 8 is an example non-limiting diagram showing an example of a game image in a case where a racing game is performed using a character belonging to a user team.
Figure 9:
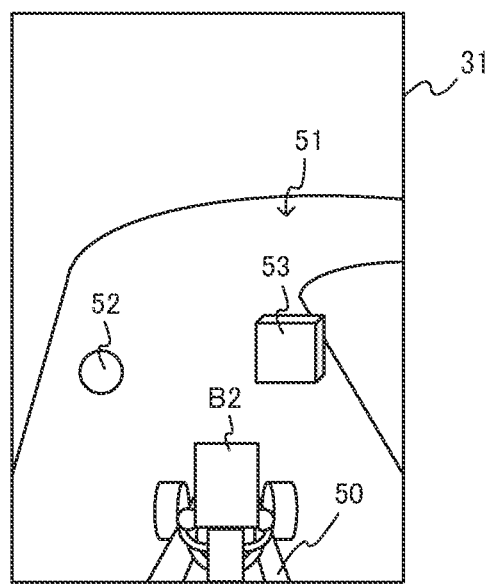
FIG. 9 is an example non-limiting diagram showing an example of a game image in a case where the racing game is performed using a character belonging to a team other than the user team.

FIG. 8 is a diagram showing an example of a game image in a case where the racing game is performed using a character belonging to the user team. FIG. 9 is a diagram showing an example of a game image in a case where the racing game is performed using a character belonging to a team other than the user team. In FIGS. 8 and 9, the racing game is executed on the same course.

As shown in FIG. 8, on the screen of the user terminal 31, the character A2 is displayed. The character A2 is a character operated by the user Y1 and is a character selected by the user Y1 in FIG. 7. The character A2 runs on a race car 50 along a course 51 toward a goal.

Although not shown in the figures, a plurality of other characters on other race cars are present on the course. The racing game is a game where the character A2 and the plurality of other characters race and aim to finish in first place. For example, the racing game may be performed using a predetermined number of characters including the character A2 operated by the user Y1 and a character operated by a user different from the user Y1. Alternatively, the racing game may be performed using a predetermined number of characters including the character A2 operated by the user Y1 and a plurality of characters controlled by the CPU of the user terminal 31 (or the CPU of the server 2).

On the course 51, various virtual objects are placed. For example, on the course, a point object 52 and an item box 53 are placed. The point object 52 is a virtual object that can be acquired by the character A2 and is an object related to individual points. If the character A2 passes through an area where the point object 52 is displayed, the user Y1 gains individual points. The item box 53 is an object that stores an item. If the character A2 passes through an area where the item box 53 is displayed, the character A2 acquires the item. The item is, for example, an object for the user to advance the racing game advantageously. For example, the item may be an object that attacks another character, or may be an object that defends against an attack of another character. Alternatively, the item may be an object for increasing the speed of the character A2 (the race car). Alternatively, the item may be an object that gives individual points to the user.

As shown in FIGS. 8 and 9, the point object 52 and the item box 53 are placed on the course, regardless of whether the racing game is performed using a character belonging to the user team or the racing game is performed using a character belonging to a team other than the user team. The point object 52 and the item box 53 are also placed on the course in the racing game executed during the non-specified period.

In a case where the user Y1 performs the racing game using the character A2 belonging to the user team, a team medal 54 is placed on the course 51 (FIG. 8). On the course, a plurality of team medals 54 are placed. The team medals 54 are placed on the course only during the specified period, and are not placed on the course during the non-specified period. The user Y1 operates the character A2 to pass through a display area of any of the team medals 54 placed on the course 51 and thereby can acquire the team medal 54.

On the other hand, in a case where the racing game is performed using a character belonging to a team other than the user team, the team medals 54 are not placed on the course 51. For example, as shown in FIG. 9, in a case where the user Y1 belonging to the team A performs the racing game using the character B2 belonging to the team B, the team medals 54 are not placed on the course.

As described above, in a case where the racing game is performed using a character belonging to the user team, team medals 54 are placed on the course, and the user can acquire any of the team medals 54. The team medal 54 acquired by the user is added to the user team. Each user performs the racing game using a character belonging to the team to which the user belongs, and thereby can add a team medal to the user team. Consequently, in the team competition event, the user can contribute to the winning of the team to which the user belongs.

Each user can also acquire an item (an example of a reward) using a team medal gained in the racing game by the user. For example, if the user selects the icon 43 in FIG. 6, a list of items that can be acquired using a team medal is displayed. An item that can be acquired using a team medal may be an item for advancing the racing game advantageously, and may be the same item as or a different item from the item to be acquired through the item box 53. For example, an item that can be acquired using a team medal may be a race car that can be used in the racing game, or may be a character. An item that can be acquired using a team medal may be an image that does not influence the result of the racing game.

On the other hand, each user can also execute the racing game using a character belonging to a team other than the user team. In this case, the user cannot add team medals to the user team, but can gain individual points (an example of a second parameter related to a reward for the user).

In the racing game, a plurality of courses different in advantageousness in accordance with characters are prepared. For example, courses C1, C2, C3, and C4 are courses favorable to the characters A1, A2, A3, and A4, respectively. Courses C5, C6, C7, and C8 are courses favorable to the characters B1, B2, B3, and B4, respectively. If each character runs the course favorable to the character, for example, the process of increasing the moving velocity of the character or making corrections to facilitate the gaining of high points is performed as an example. As described above, examples of "different in advantageousness" include the difference in the ease of advancing the game itself and the difference in point or reward to be obtained as a result of performing the game.

There may be a plurality of courses at which a single character is good (courses favorable to the character). Alternatively, there may be a plurality of characters good at a single course.

The user selects a character advantageous on the course of the racing game to be executed and thereby can execute the racing game using the selected character. For example, in a case where the user Y1 owns the character A2, A3, B2, and B4, and if the racing game is to be executed on the course C2, the user Y1 can select the character A2 advantageous on the course C2 (the character A2 good at the course C2) and perform the racing game. In this case, it is easy for the user Y1 to finish in first place or gain high points in the racing game on the course C2, and the user Y1 can also gain a team medal 54.

In a case where the racing game is executed on the course C6, the characters A2 and A3 belonging to the team A are not good at the course C6, and therefore, even if the user Y1 performs the racing game on the course C6 using the character A2 or A3, it is difficult to gain a high ranking or high points. The user Y1 owns the character B2 good at the course C6. Thus, to finish in first place or gain high points in the racing game on the course C6, the user Y1 can select the character B2 belonging to the team B to which the user Y1 does not belong, and perform the racing game on the course C6. In this case, the user Y1 cannot acquire a team medal 54 and contribute to the team A to which the user Y1 belongs, but can gain high individual points. If the user Y1 gains high individual points, the user Y1 can obtain a reward (e.g., a rise in the rankings or a rise in the level).

Each user can confirm the current situation of each team in the team competition event using the user terminal 3 of the user. Thus, in accordance with the current situation of each team, each user can select whether to perform the racing game using a character of the team to which the user belongs, or perform the racing game using a character of the opposing team. For example, in a case where the team to which the user belongs has an overwhelming advantage over the opposing team, the user deliberately performs the racing game using a character of the opposing team to avoid a one-sided battle, and thereby can prevent the addition of team medals to the team of the user.

In the exemplary embodiment, a plurality of users can perform a single racing game via the server 2. For example, the user Y1 and the user Y3 can perform the same racing game. In this case, an operation of the user Y1 on the user terminal 31 is reflected on the game processing in the user terminal 33 of the user Y3. For example, in a case where the user Y1 performs the racing game using a character of the team B (the opposing team), and if the user Y1 finishes in first place, the team B wins. In this case, in the racing game in the user terminal 31 of the user Y1, the user Y1 cannot gain team medals. On the other hand, in the racing game in the user terminal 33 of the user Y3, team medals are placed on the course. Thus, the user Y3 can gain team medals. In the racing game in the user terminal 33 of the user Y3, in addition to the team medals gained by the user Y3, the user Y3 can gain bonus medals due to the winning of the team B.

As described above, in a case where the user Y1 performs the racing game using a character of the opposing team, the user Y1 can indirectly add team medals to the opposing team.

(Details of Processes)

Next, the details of processes performed by the user terminals 3 and the server 2 are described. First, data stored in each user terminal 3 and the server 2 is described.

Figure 10:
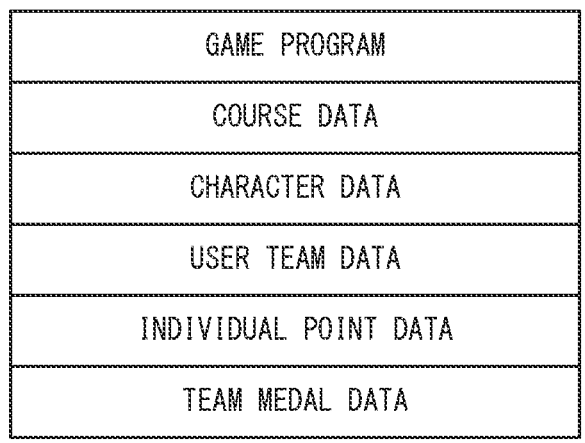
FIG. 10 is an example non-limiting diagram showing an example of data stored in a memory or a storage device of each user terminal 3.

FIG. 10 is a diagram showing an example of data stored in the memory or the storage device of each user terminal 3. As shown in FIG. 10, the user terminal 3 stores a game program, course data, character data, user team data, individual point data, and team medal data. In addition to the data shown in FIG. 10, the user terminal 3 stores various pieces of data.

The game program is a program for executing the game application according to the exemplary embodiment and is a program for performing a terminal process executed by the user terminal 3 described below. The game program includes a program for performing the racing game, a program regarding the execution of the team competition event, and the like. The course data is data regarding the course of the racing game and includes data regarding the shape of the course and data regarding various virtual objects placed on the course.

The character data is data regarding a character owned by the user and is data including, for example, an image, the level, the characteristic value, and the like of the character. The user team data is data regarding a team to which the user belongs, and is data indicating the team A or the team B.

The individual point data is data regarding individual points gained in the racing game by the user. The individual point data is data regarding the accumulation of individual points gained in a plurality of racing games performed during the specified period by the user.

The team medal data is data regarding team medals gained in the racing game by the user. The team medal data is data regarding the accumulation of team medals (including bonus medals) gained in a plurality of racing games performed during the specified period by the user.

The course data, the character data, the user team data, the individual point data, and the team medal data are stored in the server 2. When starting the game application according to the exemplary embodiment or while executing the game application, the user terminal 3 accesses the server 2 and acquires these pieces of data from the server 2.

Figure 11:
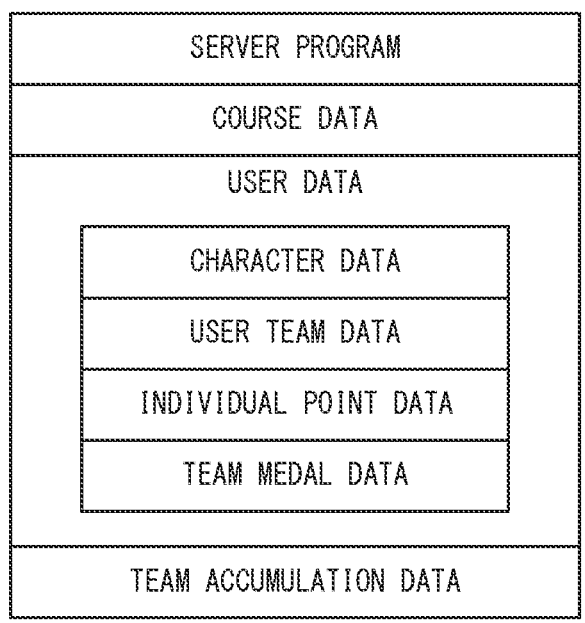
FIG. 11 is an example non-limiting diagram showing an example of data stored in a memory or a storage device of the server 2.

FIG. 11 is a diagram showing an example of data stored in the memory or the storage device of the server 2. As shown in FIG. 11, the server 2 stores a server program, course data, user data, and team accumulation data.

The server program is a program for controlling the racing game according to the exemplary embodiment and the team competition event related to the racing game and is a program for executing a server process performed by the server 2 described below. The course data is data regarding each course of the racing game. The course data includes information regarding the positions and the types of various objects placed on the course.

The user data is data regarding a user and is stored with respect to each user. The user data includes character data, user team data, individual point data, and team medal data. These pieces of data are as described with reference to FIG. 10.

The team accumulation data is data regarding the accumulation value of team medals of each team during the specified period. The team accumulation data includes data regarding the accumulation value of team medals of the team A and data regarding the accumulation value of team medals of the team B. Every time the racing game is performed in each user terminal 3, the team accumulation data is updated.

(Details of Process Performed by User Terminal 3)

Next, an example of a terminal process performed by each user terminal 3 is specifically described.

Figure 12:
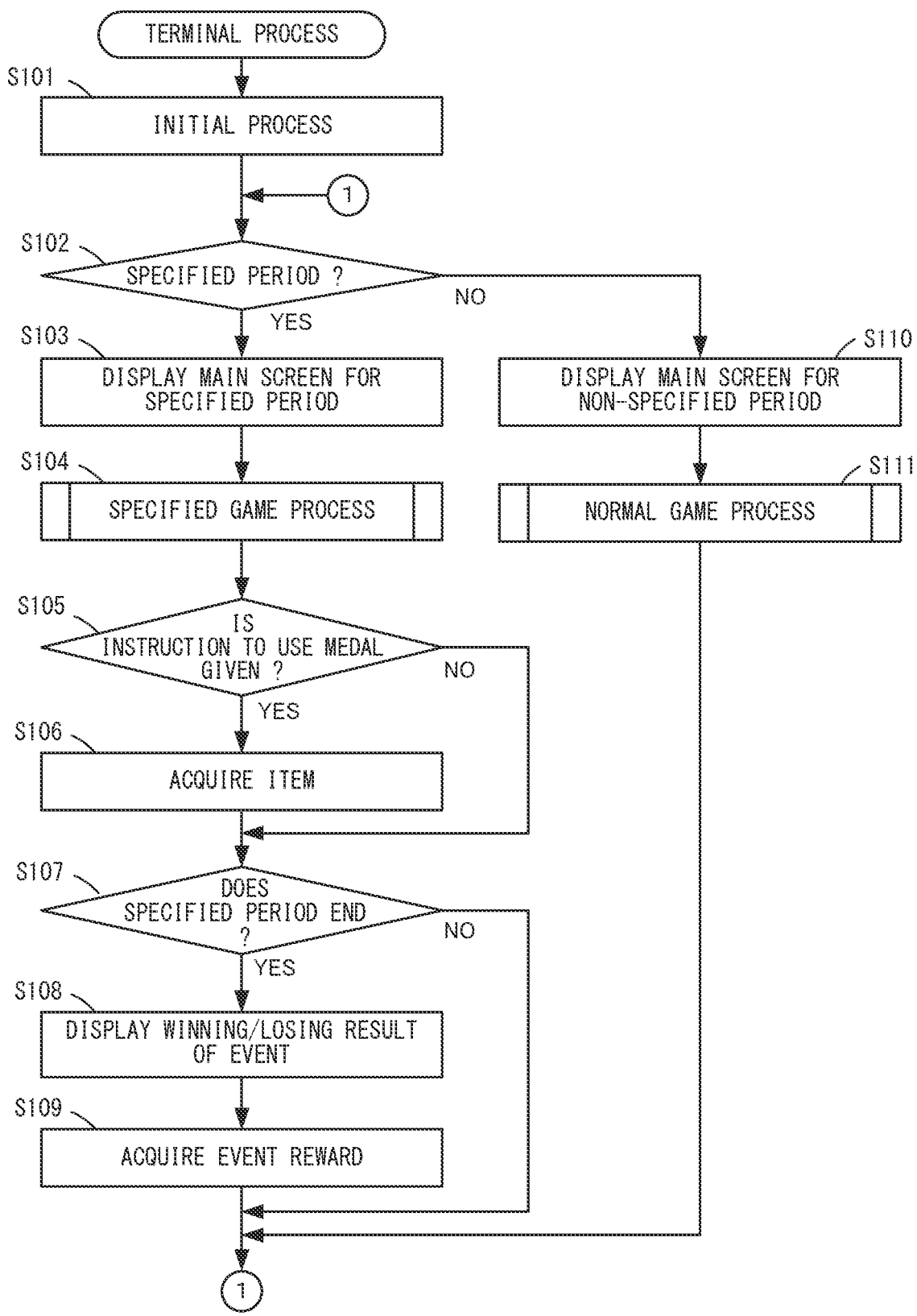
FIG. 12 is an example non-limiting flow chart showing an example of a terminal process performed by the user terminal 3.

FIG. 12 is a flow chart showing an example of the terminal process performed by the user terminal 3. The process shown in FIG. 12 is performed by the CPU of the user terminal 3 executing the game program. During the execution of the process in FIG. 12, the user terminal 3 communicates with the server 2 at an appropriate timing, and transmits and receives necessary data to and from the server 2.

As shown in FIG. 12, first, the user terminal 3 performs an initial process (step S101). In the initial process, the user terminal 3 communicates with the server 2 and acquires data (the character data, the course data, another image, and the like) required to execute the game application from the server 2.

Next, based on the current date-and-time information, the user terminal 3 determines whether or not the current moment is during the specified period (step S102). If the current moment is during the specified period (step S102: YES), the user terminal 3 displays the main screen for the specified period (step S103). Here, the main screen exemplified in FIG. 6 is displayed. On the main screen, the current situations of the team A and the team B are displayed. The user terminal 3 acquires information regarding the current accumulation values of team medals of the team A and the team B from the server 2, and based on the acquired information, displays the situation display 40 indicating the current situations of the team A and the team B. If the bonus period is set for the team A or the team B in the server 2, the bonus period display 41 is displayed on the main screen.

Figure 13:
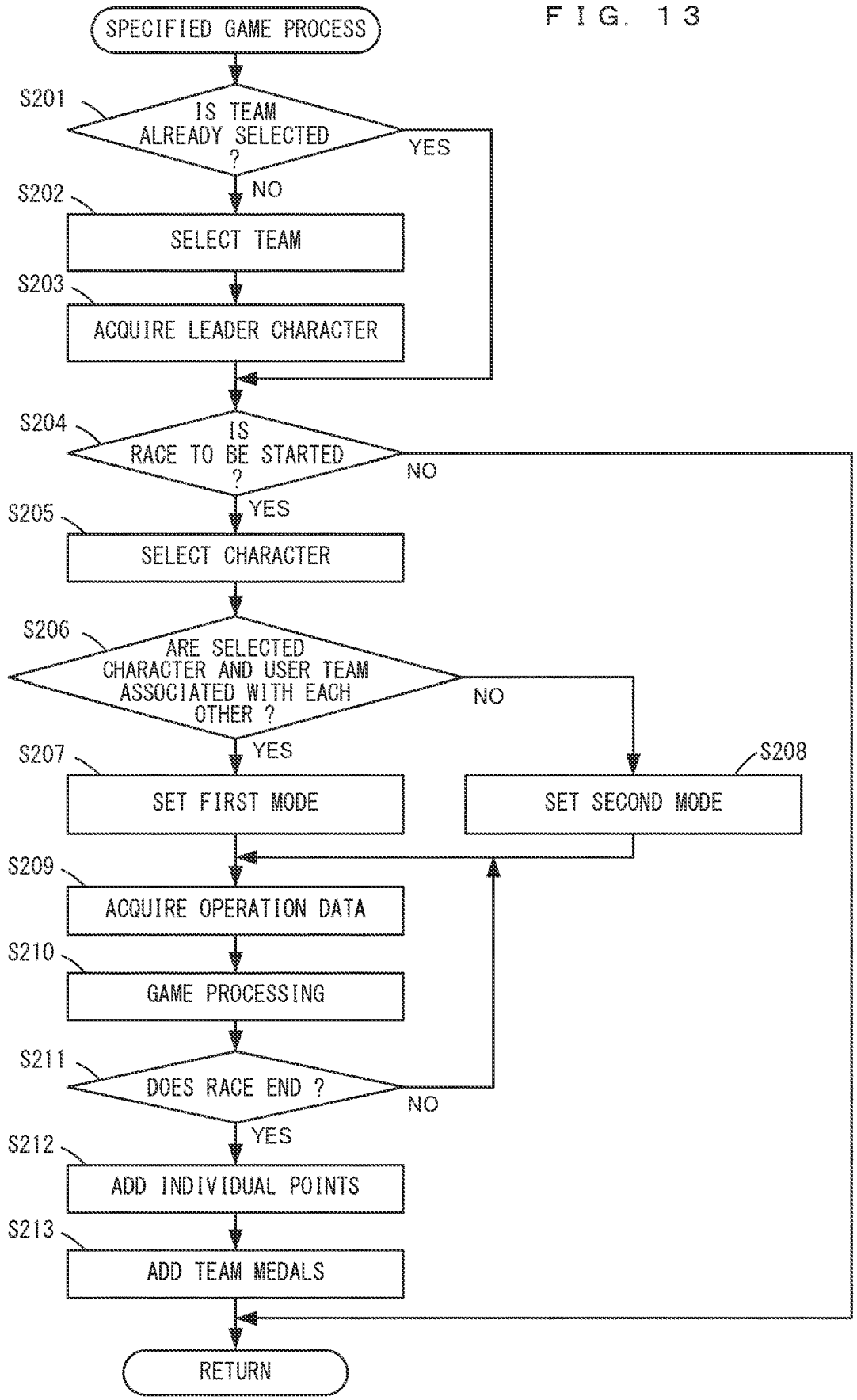
FIG. 13 is an example non-limiting flow chart showing an example of a specified game process in step S104.

Next, the user terminal 3 executes a specified game process (step S104). The specified game process is a process regarding the racing game during the specified period. With reference to FIG. 13, the details of the specified game process are described below.

FIG. 13 is a flow chart showing an example of the specified game process in step S104.

First, the user terminal 3 determines whether or not a team is already selected (step S201). Information indicating whether or not a team to which the user is to belong is already selected is stored in the server 2. The user terminal 3 acquires the information from the server 2 and determines whether or not the team is already selected. In the exemplary embodiment, the user can select the team only once during the specified period. If the team is not already selected (step S201: NO), the user terminal 3 displays a selection screen for allowing the user to select the team, and receives an input provided to the input device by the user. Then, if a team selection operation is performed by the user, based on the operation, the user terminal 3 selects either one of the team A and the team B (step S202). Specifically, if a team selection operation of the user is performed, the user terminal 3 stores information regarding the selected team as the user team data and transmits the information to the server 2. The server 2 receives the information and stores the information regarding the selected team in the user data (the user team data) of the user relating to the user terminal 3.

If the user selects the team, the user terminal 3 acquires a leader character of the team selected by the user (step S203). Here, the leader character (the character A) of the team (e.g., the team A) selected by the user is given to the user having selected the team. Specifically, the server 2 saves data regarding the leader character of the team selected by the user in the character data in the user data. The user terminal 3 acquires the leader character saved in the user data in the server 2. Consequently, the user can use the acquired leader character in the racing game from this point onward.

If the process of step S203 is executed, or if the determination is YES in step S201, the user terminal 3 determines whether or not the racing game is to be started (step S204). Here, it is determined whether or not an operation of selecting a course is performed on the main screen exemplified in FIG. 6.

If it is determined that the racing game is to be started (step S204: YES), based on an input of the user, the user terminal 3 selects a character to be used in the racing game (step S205). Here, on the character selection screen exemplified in FIG. 7, any of one or more characters owned by the user (including the leader character acquired in step S203) is selected.

After step S205, the user terminal 3 determines whether or not the selected character and the user team are associated with each other (step S206). Specifically, the user terminal 3 determines whether or not the character selected in step S205 belongs to the user team selected in step S202.

If the selected character and the user team are associated with each other (step S206: YES), the user terminal 3 sets the mode of the racing game to the first mode (step S207). In the racing game in the first mode, team medals are placed on the course. If, on the other hand, the selected character and the user team are not associated with each other (step S206: NO), i.e., if the selected character does not belong to the user team, the user terminal 3 sets the mode of the racing game to the second mode (step S208). In the racing game in the second mode, the team medals are not placed on the course.

The course data acquired from the server 2 by the user terminal 3 includes position information regarding the team medals, and whether or not the team medals are to be actually placed at positions relating to the position information may be determined based on which of the first mode and the second mode is set. That is, regardless of whether the first mode is set or the second mode is set, the server 2 transmits the same course data to the user terminal 3. If the mode of the racing game is set to the first mode in step S207, the user terminal 3 may place the team medals on the course based on the position information included in the course data acquired from the server 2.

If the process of step S207 or S208 is performed, the user terminal 3 starts the racing game and acquires operation data relating to an operation performed by the user (step S209). Then, based on the acquired operation data, the user terminal 3 performs game processing (step S210).

Specifically, in step S210, the user terminal 3 moves a race car with the character selected in step S205 on board along the course. The character (the race car) automatically moves forward on the course, and in accordance with an input to the input device (e.g., the touch panel) of the user terminal 3, the moving direction of the character is controlled. In step S209, the user terminal 3 may acquire operation data regarding an operation of another user performed on the user terminal 3 of the other user from the server 2. In step S209, the user terminal 3 may receive information regarding the result of game processing relating to an operation of another user from the server 2, and in step S210, the user terminal 3 may control a character of the other user based on the received information.

On the course, various virtual objects are placed, and different processes are performed in accordance with a virtual object acquired by the character. For example, if the first mode is set, the team medals 54 are placed on the course. If the character acquires any of the team medals 54, the user terminal 3 updates the team medal data indicating the number of team medals 54 acquired in the current racing game. If, on the other hand, the second mode is set, the team medals 54 are not placed on the course. Both in the first mode and the second mode, the point object 52 and the item box 53 are placed on the course. If the character acquires the point object 52, the user terminal 3 updates the individual point data indicating individual points acquired in the current racing game. If the character performs a predetermined action (e.g., jumps using a jump ramp), the individual point data may be updated. If the character attacks another character, the individual point data may be updated.

Next, the user terminal 3 determines whether or not the racing game ends (whether or not the character of the user reaches a goal) (step S211). If the racing game does not end, the user terminal 3 executes the process of step S209 again.

The processes of steps S209 to S211 are repeatedly executed at predetermined time intervals (e.g., 1/60-second intervals), whereby the racing game progresses.

If the racing game ends (step S211: YES), the user terminal 3 adds individual points gained by the user in the current racing game (step S212). Specifically, the user terminal 3 transmits, to the server 2, information regarding the individual points gained by the user in the current racing game. Consequently, in the server 2, the individual points of the user are added (accumulated).

Next, if the first mode is set, the user terminal 3 adds team medals gained by the user in the current racing game (step S213). Specifically, the user terminal 3 transmits, to the server 2, information regarding the team medals (including bonus medals) gained by the user in the current racing game. Consequently, in the server 2, the team medals are added to (accumulated in) the team to which the user belongs, and are recorded as the team accumulation data.

For example, if the user Y1 belonging to the team A executes the racing game using the character A2, team medals are placed on the course. If the character A2 acquires "three" team medals in the racing game, in step S213, the "three" team medals are added to the team A. Further, if the team A wins the racing game, bonus medals are added to the team A. If individual points of the user Y1 gained in the current racing game are greater than a predetermined value, bonus medals are added to the team A. If the bonus period is set for the team A, bonus medals are added to the team A. In step S213, all these team medals gained in the current racing game, including the bonus medals, are added.

If the process of step S213 is performed, or if the determination is NO in step S204, the user terminal 3 ends the process shown in FIG. 13 and returns to the main screen.

Referring back to FIG. 12, after step S104, the user terminal 3 determines whether or not an instruction to use a team medal is given on the main screen (step S105). Here, the user terminal 3 determines whether or not the icon 43 for acquiring an item using a team medal is selected on the main screen.

If an instruction to use a team medal is given (step S105: YES), the user terminal 3 acquires an item using a team medal gained by the user during the specified period (step S106). Specifically, the user terminal 3 acquires from the server 2 a list of items that can be acquired by the user, displays the list on a screen, and transmits information regarding an item selected by the user to the server 2. The server 2 adds the information regarding the item selected by the user to the user data relating to the user of the user terminal 3. Consequently, the user acquires an item (an example of a reward) using a team medal.

If the process of step S106 is executed, or if the determination is NO in step S105, the user terminal 3 determines whether or not the specified period ends (step S107). Here, based on date-and-time information regarding the date and time that the user terminal 3 is counting, the user terminal 3 may determine whether or not the specified period ends. Alternatively, if the user terminal 3 receives information indicating the end of the specified period from the server 2, the user terminal 3 may determine that the specified period ends.

If the specified period ends (step S107: YES), the user terminal 3 displays the winning/losing result of the team competition event (step S108). Specifically, the user terminal 3 receives information regarding the winning/losing result of the team competition event from the server 2, and based on the received information, displays the winning/losing result of the team competition event.

Next, if the user team wins the current team competition event, the user terminal 3 acquires an event reward for the winning (step S109). Specifically, the server 2 stores data regarding the event reward in the user data of the user belonging to the winning team. If the data regarding the event reward is stored in the server 2, the user terminal 3 displays an image indicating that the event reward is acquired. The event reward may be, for example, an image for decorating a character or a race car owned by the user, or may be a character to be used in the racing game, or may be an item.

If the process of step S109 is performed, or if the determination is NO in step S107, the user terminal 3 executes the process of step S102 again.

If, on the other hand, the current moment is not during the specified period (step S102: NO), the user terminal 3 displays the main screen for the non-specified period (step S110). Here, a main screen different from the main screen exemplified in FIG. 6 is displayed. For example, on the main screen for the non-specified period, the situation display 40 is not displayed. The background image of the main screen may also be different between the non-specified period and the specified period.

Next, the user terminal 3 executes a normal game process (step S111). The normal game process is a process regarding the racing game during the non-specified period. With reference to FIG. 14, the details of the normal game process are described below.

FIG. 14 is a flow chart showing an example of the normal game process in step S111.

The user terminal 3 determines whether or not the racing game is to be started (step S301). Here, it is determined whether or not an operation of selecting a course is performed on the main screen for the non-specified period.

If it is determined that the racing game is to be started (step S301: YES), based on an input of the user, the user terminal 3 selects a character to be used in the racing game (step S302). Here, on the character selection screen, any of one or more characters owned by the user is selected.

If the process of step S302 is performed, the user terminal 3 starts the racing game and acquires operation data relating to an operation performed by the user (step S303). Then, based on the acquired operation data, the user terminal 3 performs game processing (step S304).

In step S304, similarly to step S210, the process of moving a race car with the character on board along the course is performed, but the team medals are not placed on the course. During the non-specified period, different items may be placed at the positions of the team medals to be placed during the specified period.

Next, the user terminal 3 determines whether or not the racing game ends (whether or not the character of the user reaches a goal) (step S305). If the racing game does not end, the user terminal 3 executes the process of step S303 again.

The processes of steps S303 to S305 are repeatedly executed at predetermined time intervals (e.g., 1/60-second intervals), whereby the racing game progresses.

If the racing game ends (step S305: YES), the user terminal 3 adds individual points gained by the user in the current racing game (step S306). Specifically, the user terminal 3 transmits, to the server 2, information regarding the individual points gained by the user in the current racing game. Consequently, in the server 2, the individual points of the user are added (accumulated).

If the process of step S306 is performed, or if the determination is NO in step S301, the user terminal 3 ends the process shown in FIG. 14 and returns to the main screen.

Referring back to FIG. 12, after the process of step S111, the user terminal 3 performs the process of step S102 again.

(Details of Process Performed by Server 2)

Figure 15:
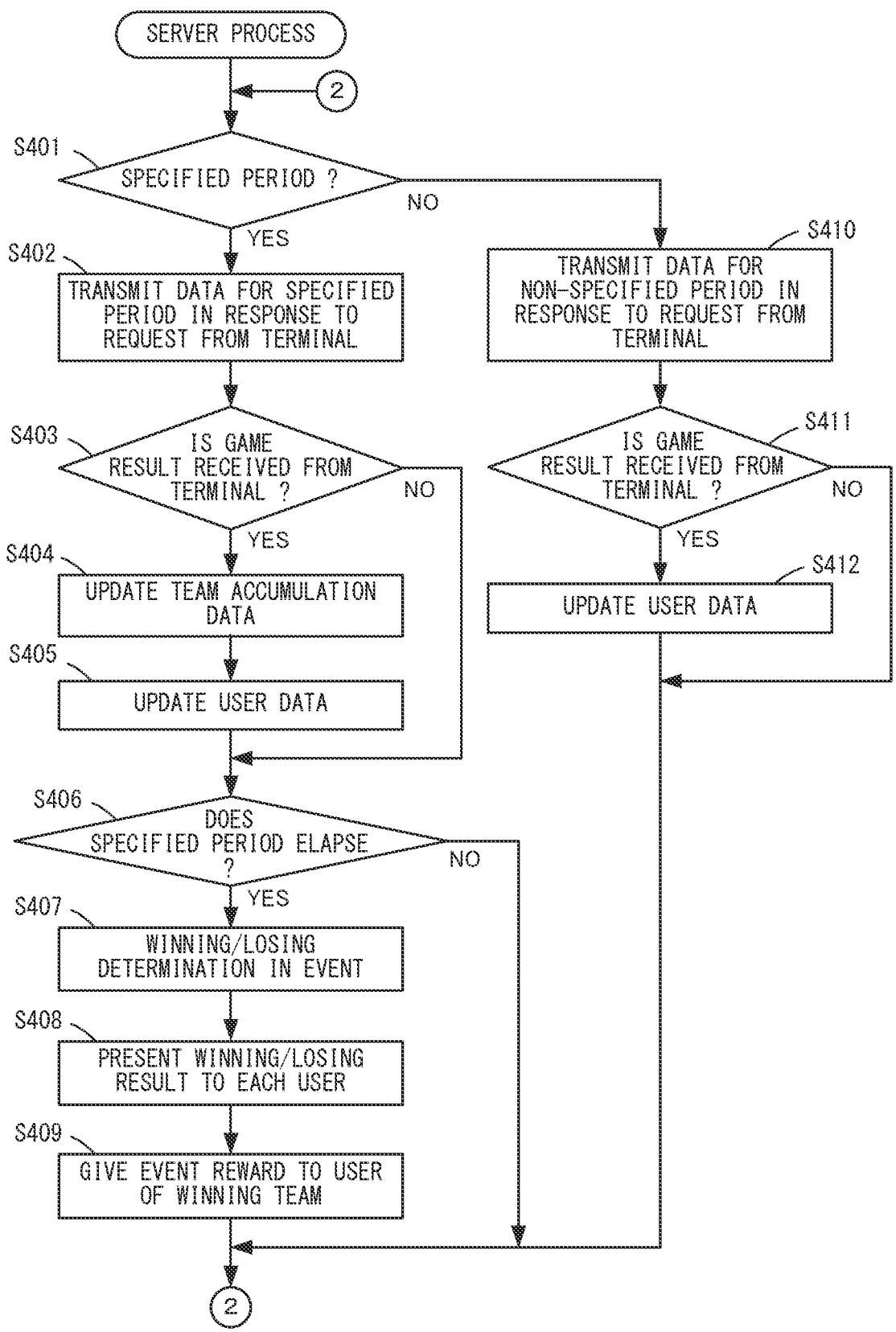
FIG. 15 is an example non-limiting flow chart showing an example of a server process performed by the server 2.

Next, an example of a server process performed by the server 2 is described. FIG. 15 is a flow chart showing an example of the server process performed by the server 2. The process shown in FIG. 15 is performed by the CPU of the server 2 executing the server program. In addition to the process shown in FIG. 15, the server 2 communicates with each user terminal 3 at an appropriate timing, and transmits and receives various pieces of data to and from the user terminal 3.

The server 2 acquires current date-and-time information, and based on the date-and-time information, determines whether or not the current moment is during the preset specified period (step S401).

If it is determined that the current moment is during the specified period (step S401: YES), in accordance with a request from any of the user terminals 3, the server 2 transmits data for the specified period to the user terminal 3 (step S402). The data for the specified period includes the course data (image data and data regarding the shape of the course) including the position information regarding the team medals, data indicating the current situation of each team, and the like. In addition to these pieces of data, the server 2 transmits data (e.g., the character data) required for the racing game to the user terminal 3.

Next, the server 2 determines whether or not the result of the racing game is received from any of the user terminals 3 (step S403). If the result of the racing game is received from any of the user terminals 3 (step S403: YES), the server 2 updates the team accumulation data (step S404). Specifically, if the process of step S213 is performed by the user terminal 3, the server 2 receives, from the user terminal 3, information regarding team medals gained in the racing game. Based on the received information, the server 2 updates the team accumulation data of the team A or the team B. Consequently, team medals acquired by the user during the specified period are accumulated with respect to each team in the server 2.

Next, the server 2 updates the user data (step S405). Specifically, if the process of step S212 is performed by any of the user terminals 3, the server 2 receives, from the user terminal 3, information regarding individual points gained in the racing game. Based on the received information, the server 2 updates the user data of the user relating to the user terminal 3. Specifically, the server 2 updates the individual point data included in the user data. Based on the updated individual point data, the server 2 gives a reward to the user. Specifically, the server 2 stores data regarding the reward in the user data of the user, thereby giving a reward to the user. The server 2 also updates the team medal data included in the user data. Consequently, team medals acquired as a result of the user performing the racing game are recorded with respect to each user.

If the process of step S405 is performed, or if the determination is NO in step S403, the server 2 determines whether or not the specified period elapses (step S406).

If the specified period elapses (step S406: YES), based on the team accumulation data of the team A and the team B, the server 2 makes a winning/losing determination in the team competition event (step S407). Here, the team having the greater accumulation value of team medals is determined as winning.

Next, the server 2 transmits the result of the winning/losing determination to each user terminal 3 and presents the result of the winning/losing determination to each user (step S408). Then, the server 2 gives an event reward to each user belonging to the winning team (step S409). Specifically, the server 2 stores data regarding the event reward in the user data of each user belonging to the winning team.

If step S409 is executed, or if the determination is NO in step S406, the server 2 executes the process of step S401 again.

If, on the other hand, the current moment is not during the specified period (step S401: NO), in accordance with a request from any of the user terminals 3, the server 2 transmits data for the non-specified period to the user terminal 3 (step S410). The data for the non-specified period includes the course data. The course data transmitted here does not include the position information regarding the team medals. The course data transmitted here may include position information similar to that in the course data transmitted in step S402. In this case, in the user terminal 3, based on the position information, the team medals may be placed during the specified period, and different items may be placed during the non-specified period. In addition to the course data, the server 2 transmits data (e.g., the character data) required for the racing game to the user terminal 3.

Next, the server 2 determines whether or not the result of the racing game is received from any of the user terminals 3 (step S411). If the result of the racing game is received from any of the user terminals 3 (step S411: YES), the server 2 updates the user data (step S412). Specifically, if the process of step S306 is performed by the user terminal 3, the server 2 receives, from the user terminal 3, information regarding individual points gained in the racing game. Based on the received information, the server 2 updates the user data (specifically, the individual point data) of the user relating to the user terminal 3. Based on the updated individual point data, the server 2 gives a reward to the user. Specifically, the server 2 stores data regarding the reward in the user data of the user, thereby giving a reward to the user.

If the process of step S412 is executed, or if the determination is NO in step S411, the server 2 returns the process to step S401.

It should be noted that the processes shown in the above flow charts are merely illustrative, and the order, the contents, and the like of the processes may be appropriately changed. Alternatively, a part of the process performed by each user terminal 3 may be performed by the server 2, and a part of the process performed by the server 2 may be performed by each user terminal 3.

As described above, in the exemplary embodiment, during a predetermined period, a team competition event is held by a plurality of teams. A user selects as a user team a team to which the user is to belong, among the plurality of teams. At the timing when the user selects the team, a leader character of the team is given to the user. During the predetermined period, the user executes a racing game regarding to the team competition event in a user terminal 3. If the racing game is performed using a character belonging to the user team among characters owned by the user, team medals are placed on a course. If the user acquires the team medals, the team medals are added to the user team. If, on the other hand, the racing game is performed using a character belonging to a team (an opposing team) other than the user team, among the characters owned by the user, the team medals are not placed on the course. In this case, the team medal are not added to the user team, and the team medal are not added to the opposing team, either. After the lapse of the predetermined period, based on the team medals of each team, the winning or losing between the plurality of teams in the team competition event is determined, and the result of the winning/losing determination is presented to each user. Regardless of whether the racing game is performed using a character belonging to the user team or performed using a character belonging to a team other than the user team, in accordance with the result of the racing game (e.g., the ranking, the type of an action performed during the race, the number of times of an action performed during the race, the types and the number of items acquired during the race, or the like), individual points are added to the user, and in accordance with the individual points, a reward is given to the user.

The user executes the racing game using a character belonging to the user team in the user terminal 3 and thereby can add the team medals to the user team and contribute to the winning of the team. The user can also perform the racing game using a character of the opposing team. In a case where the user performs the racing game using the character of the opposing team, the team medals are not added to the user team, but the user can gain individual points. The user gains individual points and thereby can raise the level or raise the ranking. Thus, the user can obtain a reward.

At the start of the predetermined period, the user selects any of the plurality of teams as the user team. At the timing when the user selects the team, the user can acquire a leader character of the selected team. Thus, during the predetermined period, the user can perform the racing game using the acquired leader character. For example, even if the user does not own a character of the team A before the start of the predetermined period, the user belongs to the team A at the start of the predetermined period, thereby acquiring the leader character A of the team A. Thus, during the predetermined period, the user can perform the racing game using the character of the team A.

The racing game includes a plurality of courses. For each character, a course at which the character is good and a course at which the character is bad are set. If the user performs the game on the course at which the character is good, it is easy for the user to gain high individual points. In a case where a character belonging to the opposing team among the characters owned by the user is good at a certain course, the user can perform the game on the certain course using the character belonging to the opposing team and gain high individual points. Consequently, the user can obtain a reward.

As described above, in the exemplary embodiment, the user can select whether to perform the racing game using a character of the team to which the user belongs, or perform the racing game using a character of the opposing team. In accordance with the situation of the user team or the situation of individual points of the user, the user can determine which of the teams is to be selected so that the game is performed using a character of the selected team. Thus, it is possible to widen the range of choices for the game and strategically perform the game in accordance with the situation. As described above, in the exemplary embodiment, it is possible to diversify the play style of the user.

(Variations)

While the exemplary embodiment has been described above, in another exemplary embodiment, the exemplary embodiment is not limited to the above configurations, and may be modified as follows.

For example, in the above exemplary embodiment, the racing game is performed as the predetermined game in each user terminal 3. In another exemplary embodiment, any other game may be performed. For example, in each user terminal 3, as the predetermined game, a fighting game where characters fight against each other, a game where groups compete against each other, a sport game such as tennis or baseball, a quiz game, a card game, a game where a character is caused to perform a predetermined mission, another game for competing for winning or losing or for rankings, or the like may be performed.

The predetermined game may be a game where a single user operates a single character, or may be a game where a single user operates a plurality of characters. The predetermined game may be a game where a character operated by a single user and a character controlled by a CPU compete against each other, or may be a game where a character operated by a single user and a character controlled by a CPU may cooperate with each other. The predetermined game may be a game where characters operated by a plurality of users compete against each other, or may be a game where characters operated by a plurality of users may cooperate with each other. The predetermined game may be a game where a plurality of characters operated by a plurality of users and a character controlled by a CPU compete against each other, or may be a game where a plurality of characters operated by a plurality of users and a character controlled by a CPU cooperate with each other.

In the above exemplary embodiment, if the racing game is performed using a character belonging to the user team among the characters owned by the user, team medals are placed on the course, and if the racing game is performed using a character belonging to a team other than the user team, the team medals are not placed on the course. In another exemplary embodiment, if a user content used in the game and a user team are associated with each other, the first parameter regarding the user team may be able to be updated, and if the user content used in the game and a team other than the user team are associated with each other, the update of the first parameter regarding the user team may be restricted.

Here, "the user content used in the game" may mean, for example, a character owned by the user and a character used in the game, or may mean an item owned by the user and an item used in the game. "The user content and the user team are associated with each other" means, for example, that the user content used in the predetermined game belongs to the user team. "The user content and the team other than the user team are associated with each other" means, for example, that the user content used in the predetermined game belongs to the team other than the user team. "The user content and the user team are associated with each other" may mean that the user content used in the predetermined game and the content belonging to the user team have a predetermined relationship. For example, suppose that the user Y1 owns the character A1 as an example of the user content. The user Y1 selects as the user team a team C to which the character C1 having a predetermined relationship with the character A1 belongs. That is, the user team of the user Y1 is the team C. In this case, it may be considered that "the character A1 and the user team are associated with each other".

"The first parameter is updated" may include increasing the first parameter, setting the first parameter, and decreasing the first parameter.

"The update of the first parameter is restricted" includes not updating (increasing or decreasing) the first parameter, making the amount of update of the first parameter smaller than in a case where the user content and the user team are associated with each other, making it more difficult to update the first parameter than in a case where the user content and the user team are associated with each other, and decreasing the first parameter. For example, if the racing game is performed using a character belonging to the user team among the characters owned by the user, many team medals may be placed on the course, and if the racing game is performed using a character belonging to a team other than the user team, few team medals may be placed on the course. If the racing game is performed using a character belonging to the user team, the team medals may be placed at locations where it is relatively easy to acquire the team medals, and if the racing game is performed using a character belonging to a team other than the user team, the team medals may be placed at locations where it is relatively difficult to acquire the team medals.

If the predetermined game is performed using a character belonging to the user team among the characters owned by the user, update objects (e.g., team medals) for updating the first parameter may be placed in a virtual space, and if the predetermined game is performed using a character belonging to a team other than the user team, the update objects may not be placed in the virtual space, or few update objects may be placed, or it may be difficult to acquire the update objects.

In a case where the game (e.g., the racing game) regarding the team competition event is executed, on the premise that the first parameter regarding the user team is updated when an update condition is satisfied during the game, if the user content used in the game and the user team are associated with each other, the satisfaction of the update condition may be promoted, and if the user content used in the game and a team other than the user team are associated with each other, the satisfaction of the update condition may be restricted. In other words, if the user content used in the game and the user team are associated with each other, control may be performed so that the update condition is likely to be satisfied, and if the user content used in the game and a team other than the user team are associated with each other, control may be performed so that the update condition is unlikely to be satisfied.

In the above exemplary embodiment, if the user content and the user team are associated with each other, the team medals are placed on the course, and under the condition that the team medals are acquired during the game, the first parameter is updated. In another exemplary embodiment, if the user content and the user team are associated with each other, the first parameter may always be updated.

In the above exemplary embodiment, a plurality of courses different in advantageousness in accordance with characters are prepared. In another exemplary embodiment, a plurality of game stages different in advantageousness with respect to each of a plurality of characters (contents) may be prepared. Here, the game stages may be the courses in the above racing game. Alternatively, the game stages may be the scenes of the game (e.g., the scene of an interior, the scene of the inside of a cave, the scene of a desert, and the like).

In the above exemplary embodiment, if the predetermined game is performed using a character belonging to the user team among the characters owned by the user, update objects (e.g., team medals) are placed in a virtual space (e.g., the course of the racing game), and if the predetermined game is performed using a character belonging to a team other than the user team, the update objects are not placed in the virtual space. In another exemplary embodiment, if the predetermined game is performed using a character belonging to the user team among the characters owned by the user, the predetermined game may be performed in a first mode, and if the predetermined game is performed using a character belonging to a team other than the user team, the predetermined game may be performed in a second mode. The first mode may be, for example, a mode where update objects capable of updating the first parameter are placed in the virtual space as in the exemplary embodiment, and the second mode may be a mode where the update objects are not placed. The predetermined game in the first mode may be a game at a first stage, and the predetermined game in the second mode may be a game at a second stage different from the first stage. When the predetermined game is performed, the appearance of the game stage may be changed between the first mode and the second mode (e.g., if the predetermined period is a period relating to a particular festival, the decoration of the particular festival is added to the game stage in the second mode). The level of difficulty to clear the game may be set to be different between the predetermined game in the first mode and the predetermined game in the second mode.

In another exemplary embodiment, if the user content used in the game and the user team are associated with each other, the game may be executed in a first game mode, and if the user content used in the game and a team other than the user team are associated with each other, the game may be executed in a second game mode. Here, the first game mode may be a mode where update objects are placed in a virtual space, and the second game mode may be a mode where the update objects are not placed in the virtual space. The game in the first game mode may be a game at a first stage, and the game in a second game mode may be a game at a second stage. The first game mode may be the mode of a game where the level of difficulty is relatively low (high), and the second game mode may be the mode of a game where the level of difficulty is relatively high (or low). The first game mode may be the mode of a game where a function is not limited (or is limited), and the second game mode may be the mode of a game where the function is limited (or is not limited).

In the above exemplary embodiment, the team competition event is held by two teams. In another exemplary embodiment, the team competition event may be held by three or more teams.

In the above exemplary embodiment, when the predetermined period elapses, information indicating which of the teams wins is displayed as the result of the team competition event. In another exemplary embodiment, when the predetermined period elapses, the rankings of teams may be displayed as the result of the team competition event.

In the above exemplary embodiment, when the team to which the user is to belong is selected, a leader character of the selected team is given to the user. In another exemplary embodiment, a member character of the team selected by the user may be given to the user. A character randomly selected from among the characters belonging to the team selected by the user may be given to the user. In another exemplary embodiment, a character (a leader character or a member character) of a team other than the team selected by the user may be given to the user when the team is selected.

In the above exemplary embodiment, in accordance with a selection operation of the user, the user team is set. In another exemplary embodiment, the user team may be automatically set not in accordance with an operation of the user. For example, in accordance with the type of a character owned by the user, the user team to which the user is to belong may be set. For example, a team to which a character that is not owned by the user belongs may be set as the user team. In accordance with the level of the user, the user team may be set. The automatic setting of the user team may be made in each user terminal 3, or may be made in the server 2.

In the above exemplary embodiment, regardless of whether the racing game is performed using a character belonging to the user team or the racing game is performed using a character belonging to a team other than the user team, individual points (the second parameter) are given in accordance with the result of the racing game, and a reward (e.g., a rise in the level or the ranking) is given to the user based on the individual points. The reward to be given to the user in accordance with the result of the racing game may be any reward. For example, the reward to be given to the user in accordance with the result of the racing game may be an item that can be used in the game, or may be a character, or may be the right to play the game. The reward to be given to the user may be virtual currency that can be used inside and outside the game, or may be in-game currency. The reward to be given to the user may be image or sound data. The reward to be given to the user may be individual points themselves.

In the above exemplary embodiment, with respect to each course, a character good at the course is set, and if the character good at the course runs the course, it is easy to gain high individual points. In another exemplary embodiment, in accordance with a character used in the predetermined game, a reward may be likely to be given to the user. For example, in a case where there is a first character and a second character that performs the predetermined game more advantageously than the first character, and the predetermined game is performed using the second character regardless of whether or not the second character belongs to the user team, the reward may be more likely to be given to the user than in a case where the predetermined game is performed using the first character. Here, "the reward is likely to be given to the user" means that even if the same game operation is performed (even with the same skill), it is likely that the reward is given, the amount of the reward to be given is likely to be great, or the reward to be given may be more favorable to the user. For example, if the reward to be given to the user is individual points, the state where it is likely that individual points are given and the state where higher individual points are given are "the reward is likely to be given to the user". If the reward to be given to the user is a rise in the level of the user, the state where it is likely that the level rises and the state where the level rises to a higher level are "the reward is likely to be given to the user". If the reward to be given to the user is a character or an item, the state where it is likely that the character or the item is given and the state where a stronger character or item is given are "the reward is likely to be given to the user".

In the above exemplary embodiment, if the user performs the predetermined game using a character belonging to the user team, team medals are given to the user team, and if the user performs the predetermined game using a character belonging to a team other than the user team, the team medals are not given. In another exemplary embodiment, if the user performs the predetermined game using a character belonging to an opposing team, the team medals may be given to the opposing team. In this case, the team medals to be given to the opposing team may be fewer than the team medals to be given to the user team in a case where the user performs the predetermined game using the character belonging to the user team.

In the above exemplary embodiment, regardless of the winning or losing of the user team in the racing game, in accordance with the number of team medals acquired by the user, team medals are added to the user team. In another exemplary embodiment, if the user team wins the racing game, in accordance with the number of team medals acquired by the user, team medals may be added to the user team.

In the above exemplary embodiment, teams compete for the number of team medals acquired in the team competition event. In another exemplary embodiment, any team competition event may be held. For example, an event where teams scramble for territories may be held as the team competition event. An event where a character, a leader, and an army of an opposing team are defeated may be held as the team competition event.

In the above exemplary embodiment, a team selected by the user is fixed during the predetermined period. In another exemplary embodiment, the team to which the user belongs may be able to be changed during the predetermined period.

A plurality of specified periods when the team competition event is held may be set. In this case, during each specified period, the type of a character belonging to each team may be different. The user selects a team during each specified period and acquires a character belonging to the selected team. Consequently, by selecting a team during each specified period, it is possible to acquire different characters.

The above predetermined period is merely an example, and it goes without saying that the start date and time of the period and the length of the period are not limited to these. For example, the predetermined period may be within a day, or may be several days, or may be two weeks, or may be one to several months.

In the above exemplary embodiment, as a result of the team competition event, an event reward is given to all the users belonging to a winning team. In another exemplary embodiment, the event reward may be given to some of the users of the winning team (e.g., a user having gained many team medals, a user having gained many individual points, a user selected by a lottery, or the like). In another exemplary embodiment, the event reward may be given to users (all the users or some of the users) of a losing team. As the event reward, an image, virtual currency, in-game currency, a character, an item, or the like may be given. The user may be allowed to select the type of the event reward.

The above processes may be performed by either of the server 2 and each user terminal 3. For example, a part of the above process performed by the server 2 may be performed by each user terminal 3, or a part of the above process performed by each user terminal 3 may be performed by the server 2.

The configurations of the above exemplary embodiment, other exemplary embodiments, and their variations can be optionally combined together unless they contradict each other. Further, the above description is merely an example of the exemplary embodiment, and may be improved and modified in various manners.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system for providing a team competition event performed by a plurality of teams to a user during a predetermined period, the information processing system comprising: at least one processor and a memory coupled thereto, the at least one processor being configured to control the information processing system to at least:
   set as a user team a team to which the user belongs among the plurality of teams;
   execute a game regarding the team competition event using a user content owned by the user among a plurality of contents during the predetermined period;
   in a case where the game is executed, and if the user content used in the game and the user team are associated with each other, enable a first parameter regarding the user team to be updated, and if the user content used in the game and a team other than the user team are associated with each other, restrict the update of the first parameter;
   in a case where the game is executed, regardless of whether or not the user content used in the game and the user team are associated with each other, set a second parameter regarding the user in accordance with a result of the game, and based on the second parameter, give a first reward to the user; and
   after a lapse of the predetermined period, based on the updated first parameter of each of the plurality of teams, present winning or losing or rankings between the plurality of teams in the team competition event to the user.

2. The information processing system according to claim 1, wherein
   the game includes a plurality of game stages different in advantageousness in the game according to which of the plurality of contents is used,
   the at least one processor is configured to control the information processing system to select any of the plurality of user contents based on an operation of the user, and
   the game is executed at any of the plurality of game stages using the selected user content.

3. The information processing system according to claim 1, wherein
   if the user content used in the game and the user team are associated with each other, the game is executed in a first mode, and
   if the user content used in the game and the user team are not associated with each other, the game is executed in a second mode different from the first mode.

4. The information processing system according to claim 3, wherein
   the game is a game where a movement object can be moved in a virtual space,
   in the first mode, an update object capable of updating the first parameter is placed in the virtual space,
   in the second mode, the update object is not placed in the virtual space, and
   in the first mode, if the movement object acquires the update object, the first parameter is updated.

5. The information processing system according to claim 1, wherein
   the at least one processor is configured to control the information processing system to:
   set a team selected by the user as the user team; and
   give a content relating to the user team to the user when the user selects the user team.

6. The information processing system according to claim 1, wherein
   the at least one processor is configured to control the information processing system to give a second reward to the user using the first parameter updated in the game.

7. The information processing system according to claim 1, wherein
   the game is a competition game performed by the plurality of teams,
   each of the plurality of contents belongs to any of the plurality of teams,
   the at least one processor is configured to control the information processing system to:
   based on an operation of the user, select the user content belonging to the user team or the user content belonging to the team other than the user team;
   execute the competition game using the selected user content;
   if the competition game is performed using the user content belonging to the user team, update the first parameter; and
   if the competition game is performed using the user content belonging to the team other than the user team, restrict the update of the first parameter.

8. The information processing system according to claim 7, wherein
   regardless of whether the competition game is performed using the user content belonging to the user team or the competition game is performed using the user content belonging to the team other than the user team, the first reward is given in accordance with a result of the competition game.

9. The information processing system according to claim 8, wherein
   the user content includes a first user content and a second user content with which the competition game is performed more favorably to the user than with the first user content, and
   regardless of whether or not the second user content belongs to the user team, if the competition game is performed using the second user content, the first reward is more likely to be given to the user than in a case where the competition game is performed using the first user content.

10. The information processing system according to claim 1, wherein
    the at least one processor is configured to control the information processing system to, after the lapse of the predetermined period, give a third reward to the user based on the winning or losing or the rankings between the plurality of teams in the team competition event.

11. A non-transitory computer-readable storage medium having stored therein an information processing program executed by a computer of an information processing apparatus for providing a team competition event performed by a plurality of teams to a user during a predetermined period, the information processing program causing the computer to:
- execute a game regarding the team competition event using a user content owned by the user among a plurality of contents during the predetermined period;
- in a case where the game is executed, and if the user content used in the game and a user team to which the user belongs among the plurality of teams are associated with each other, enable a first parameter regarding the user team to be updated, and if the user content used in the game and a team other than the user team are associated with each other, restrict the update of the first parameter;
- in a case where the game is executed, regardless of whether or not the user content used in the game and the user team are associated with each other, set a second parameter regarding the user in accordance with a result of the game, and based on the second parameter, give a first reward to the user; and
- after a lapse of the predetermined period, based on the updated first parameter of each of the plurality of teams, present winning or losing or rankings between the plurality of teams in the team competition event to the user.

12. An information processing apparatus for providing a team competition event performed by a plurality of teams to a user during a predetermined period, the information processing apparatus comprising: at least one processor and a memory coupled thereto, the at least one processor being configured to control the information processing system to at least:
- execute a game regarding the team competition event using a user content owned by the user among a plurality of contents during the predetermined period;
- in a case where the game is executed, and if the user content used in the game and a user team to which the user belongs among the plurality of teams are associated with each other, enable a first parameter regarding the user team to be updated, and if the user content used in the game and a team other than the user team are associated with each other, restrict the update of the first parameter;
- in a case where the game is executed, regardless of whether or not the user content used in the game and the user team are associated with each other, set a second parameter regarding the user in accordance with a result of the game, and based on the second parameter, give a first reward to the user; and
- after a lapse of the predetermined period, based on the updated first parameter of each of the plurality of teams, present winning or losing or rankings between the plurality of teams in the team competition event to the user.

13. An information processing method performed by an information processing system for providing a team competition event performed by a plurality of teams to a user during a predetermined period, the information processing method comprising:
- setting as a user team a team to which the user belongs among the plurality of teams;
- executing a game regarding the team competition event using a user content owned by the user among a plurality of contents during the predetermined period;
- in a case where the game is executed, and if the user content used in the game and the user team are associated with each other, enabling a first parameter regarding the user team to be updated, and if the user content used in the game and a team other than the user team are associated with each other, restricting the update of the first parameter;
- in a case where the game is executed, regardless of whether or not the user content used in the game and the user team are associated with each other, setting a second parameter regarding the user in accordance with a result of the game, and based on the second parameter, giving a first reward to the user; and
- after a lapse of the predetermined period, based on the updated first parameter of each of the plurality of teams, presenting winning or losing or rankings between the plurality of teams in the team competition event to the user.

14. An information processing system for providing a team competition event performed by a plurality of teams to a user during a predetermined period, the information processing system comprising: at least one processor and a memory coupled thereto, the at least one processor being configured to control the information processing system to at least:
- set as a user team a team to which the user belongs among the plurality of teams;
- execute a game regarding the team competition event using a user content owned by the user among a plurality of contents during the predetermined period;
- if the user content used in the game and the user team are associated with each other, execute the game in a first game mode;
- if the user content used in the game and a team other than the user team are associated with each other, execute the game in a second game mode;
- in a case where the game is executed, regardless of whether or not the user content used in the game and the user team are associated with each other, in accordance with a result of the game in the first game mode or the second game mode, give a reward to the user; and
- after a lapse of the predetermined period, based on the result of the game in the first game mode, present winning or losing or rankings between the plurality of teams in the team competition event to the user.

15. The information processing system according to claim 14, wherein
- if the user content used in the game and the user team are associated with each other, the game is executed in the first game mode where a predetermined object is placed in a virtual space, and
- if the user content used in the game and the team other than the user team are associated with each other, the game is executed in the second game mode where the predetermined object is not placed in the virtual space.

16. A non-transitory computer-readable storage medium having stored therein an information processing program executed by a computer of an information processing apparatus for providing a team competition event performed by a plurality of teams to a user during a predetermined period, the information processing program causing the computer to:

execute a game regarding the team competition event using a user content owned by the user among a plurality of contents during the predetermined period;

if the user content used in the game and a user team to which the user belongs among the plurality of teams are associated with each other, execute the game in a first game mode;

if the user content used in the game and a team other than the user team are associated with each other, execute the game in a second game mode;

in a case where the game is executed, regardless of whether or not the user content used in the game and the user team are associated with each other, in accordance with a result of the game in the first game mode or the second game mode, give a reward to the user; and after a lapse of the predetermined period, based on the result of the game in the first game mode, present winning or losing or rankings between the plurality of teams in the team competition event to the user.

17. An information processing apparatus for providing a team competition event performed by a plurality of teams to a user during a predetermined period, the information processing apparatus comprising: at least one processor and a memory coupled thereto, the at least one processor being configured to control the information processing system to at least:

execute a game regarding the team competition event using a user content owned by the user among a plurality of contents during the predetermined period;

if the user content used in the game and a user team to which the user belongs among the plurality of teams are associated with each other, execute the game in a first game mode;

if the user content used in the game and a team other than the user team are associated with each other, execute the game in a second game mode;

in a case where the game is executed, regardless of whether or not the user content used in the game and the user team are associated with each other, in accordance with a result of the game in the first game mode or the second game mode, give a reward to the user; and after a lapse of the predetermined period, based on the result of the game in the first game mode, present winning or losing or rankings between the plurality of teams in the team competition event to the user.

18. An information processing method performed by an information processing system for providing a team competition event performed by a plurality of teams to a user during a predetermined period, the information processing method comprising:

setting as a user team a team to which the user belongs among the plurality of teams;

executing a game regarding the team competition event using a user content owned by the user among a plurality of contents during the predetermined period;

if the user content used in the game and the user team are associated with each other, executing the game in a first game mode;

if the user content used in the game and a team other than the user team are associated with each other, executing the game in a second game mode;

in a case where the game is executed, regardless of whether or not the user content used in the game and the user team are associated with each other, in accordance with a result of the game in the first game mode or the second game mode, giving a reward to the user; and after a lapse of the predetermined period, based on the result of the game in the first game mode, presenting winning or losing or rankings between the plurality of teams in the team competition event to the user.

* * * * *